US007975603B1

(12) United States Patent
Mikelsons et al.

(10) Patent No.: US 7,975,603 B1
(45) Date of Patent: *Jul. 12, 2011

(54) FOOD PROCESSING SYSTEM

(75) Inventors: Andi J. Mikelsons, Middleton, WI (US); Noel R. Johnson, Stoughton, WI (US); Dennis F. Conohan, Cross Plains, WI (US); Wendell J. Holl, Lodi, WI (US); Richard J. Jozwiak, Lodi, WI (US)

(73) Assignee: Alkar-RapidPak-MP Equipment, Inc., Lodi, WI (US)

( * ) Notice: Subject to any disclaimer, the term of this patent is extended or adjusted under 35 U.S.C. 154(b) by 1834 days.

This patent is subject to a terminal disclaimer.

(21) Appl. No.: 11/079,265

(22) Filed: Mar. 14, 2005

Related U.S. Application Data

(63) Continuation-in-part of application No. 10/309,915, filed on Dec. 4, 2002, now Pat. No. 7,325,486.

(51) Int. Cl.
 *A23B 4/00* (2006.01)
 *A23B 4/03* (2006.01)
(52) U.S. Cl. ............. 99/470; 99/483; 198/430; 198/604
(58) Field of Classification Search ............ 99/326–333, 99/467–479, 443 C, 360–362, 443 R; 198/430–432, 198/457.03, 597–598, 484.1, 418.1, 903.13, 198/952, 433; 34/208–216; 62/63, 64, 375
 See application file for complete search history.

(56) References Cited

U.S. PATENT DOCUMENTS

| | | | |
|---|---|---|---|
| 3,289,814 A | 12/1966 | Rosema | |
| 3,333,666 A * | 8/1967 | Murray et al. | 194/221 |
| 4,138,860 A | 2/1979 | Drummond | |
| 4,277,954 A | 7/1981 | Drummond | |
| 4,329,850 A | 5/1982 | Drummond | |
| 4,784,053 A | 11/1988 | Barnhart | |
| 5,143,199 A | 9/1992 | Evans | |
| 5,149,556 A * | 9/1992 | Le Viet et al. | 426/521 |
| 5,213,196 A | 5/1993 | Wolf | |
| 5,253,569 A | 10/1993 | McFarlane et al. | |
| 5,255,596 A | 10/1993 | Fessmann | |
| 5,339,727 A | 8/1994 | Fessmann | |
| 5,551,334 A | 9/1996 | Cody | |
| 5,910,330 A | 6/1999 | Fessmann | |
| 6,419,968 B1 | 7/2002 | Wang et al. | |
| 7,325,486 B1 * | 2/2008 | Nordby et al. | 99/477 |

* cited by examiner

*Primary Examiner* — Quang T Van
(74) *Attorney, Agent, or Firm* — Andrus, Sceales, Starke & Sawall, LLP

(57) ABSTRACT

A food processing system includes sweep belt transfer of food product from a conveyor to a food processor such as a cooker or chiller. The conveyor may include upstream conveyance around a turn having a moving fence. The system may include an upstream conveyor to conveyor transfer from a widening gap upper conveyor to a lower conveyor.

22 Claims, 21 Drawing Sheets

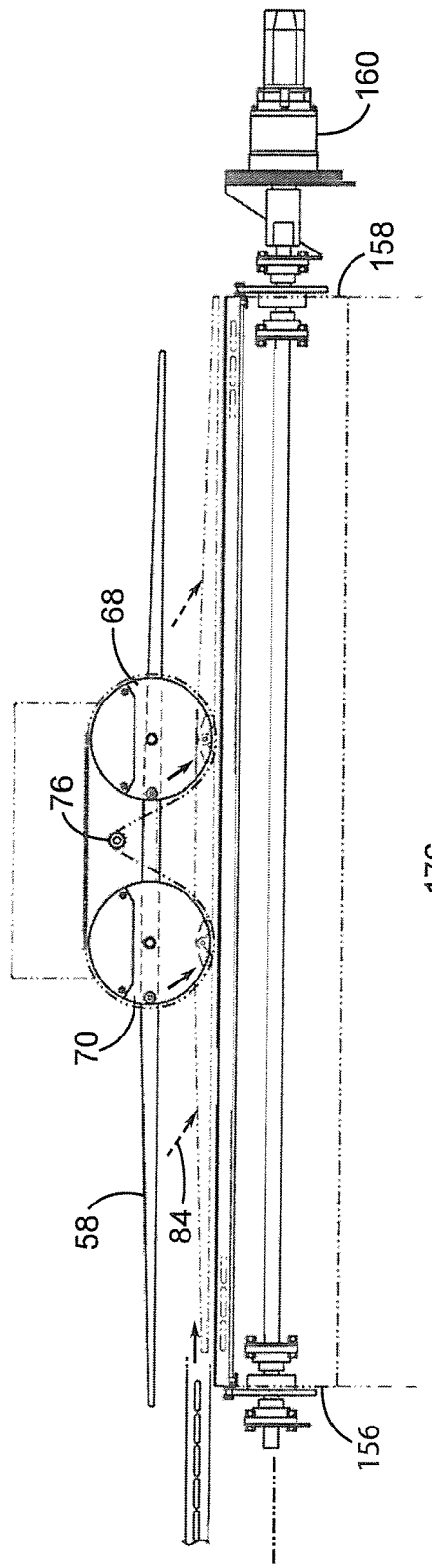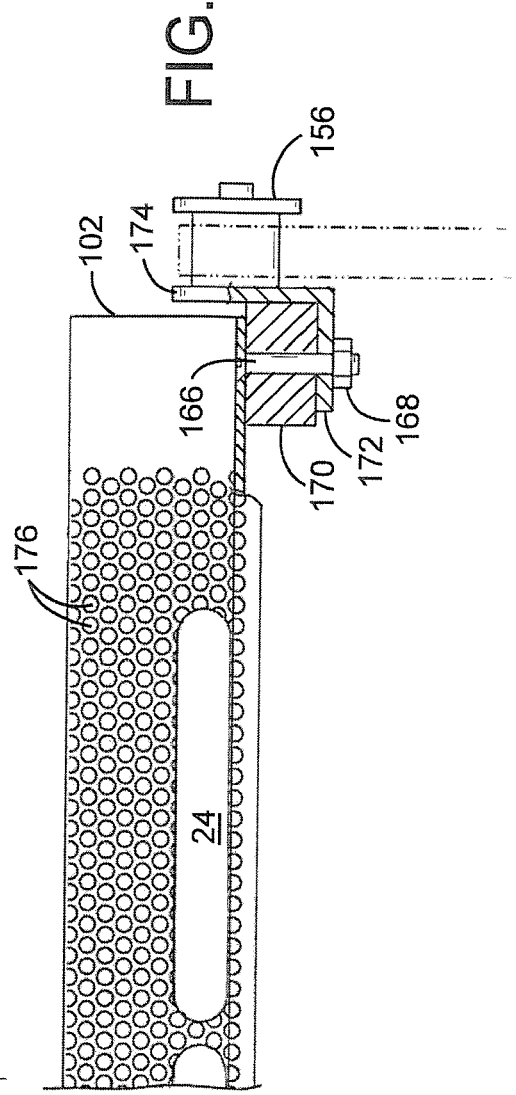

US 7,975,603 B1

FOOD PROCESSING SYSTEM

CROSS-REFERENCE TO RELATED APPLICATION

This application is a continuation-in-part of U.S. patent application Ser. No. 10/309,915, filed Dec. 4, 2002 now U.S. Pat. No. 7,325,486.

BACKGROUND AND SUMMARY

The invention relates to food processing systems, including cooking and/or chilling, for example in processing meat products such as hot dogs, sausages, poultry, fish, and other food products.

Parent Application

In one aspect of the noted parent application, a loading system is provided for fast, efficient loading from a serial supply line into a food processing chamber. In another aspect of the parent application, an improved conveyance system is provided through the food processing chamber, including improved food product cradles and carriers. In another aspect of the parent application, a simple, effective discharge system is provided at the unloading station. In another aspect of the parent application, an effective cleaning system is provided.

Present Invention

In one aspect of the present invention, a loading system is provided including a sweeper sweeping the food product from the transport conveyor to the food processor.

In another aspect, a system is provided for carrying the food product traversing around a turn.

In another aspect, an improved conveyor to conveyor transfer system is provided.

In another aspect, a sequential system is provided for conveyance of the food product.

In another aspect, an improved sequential food processing method is provided.

BRIEF DESCRIPTION OF THE DRAWING

Parent Application

FIG. 4 is a view taken along line 4-4 of FIG. 3.
FIG. 12 is an end view partially cut away of the structure of FIG. 11.

Present Application

Figure 1:
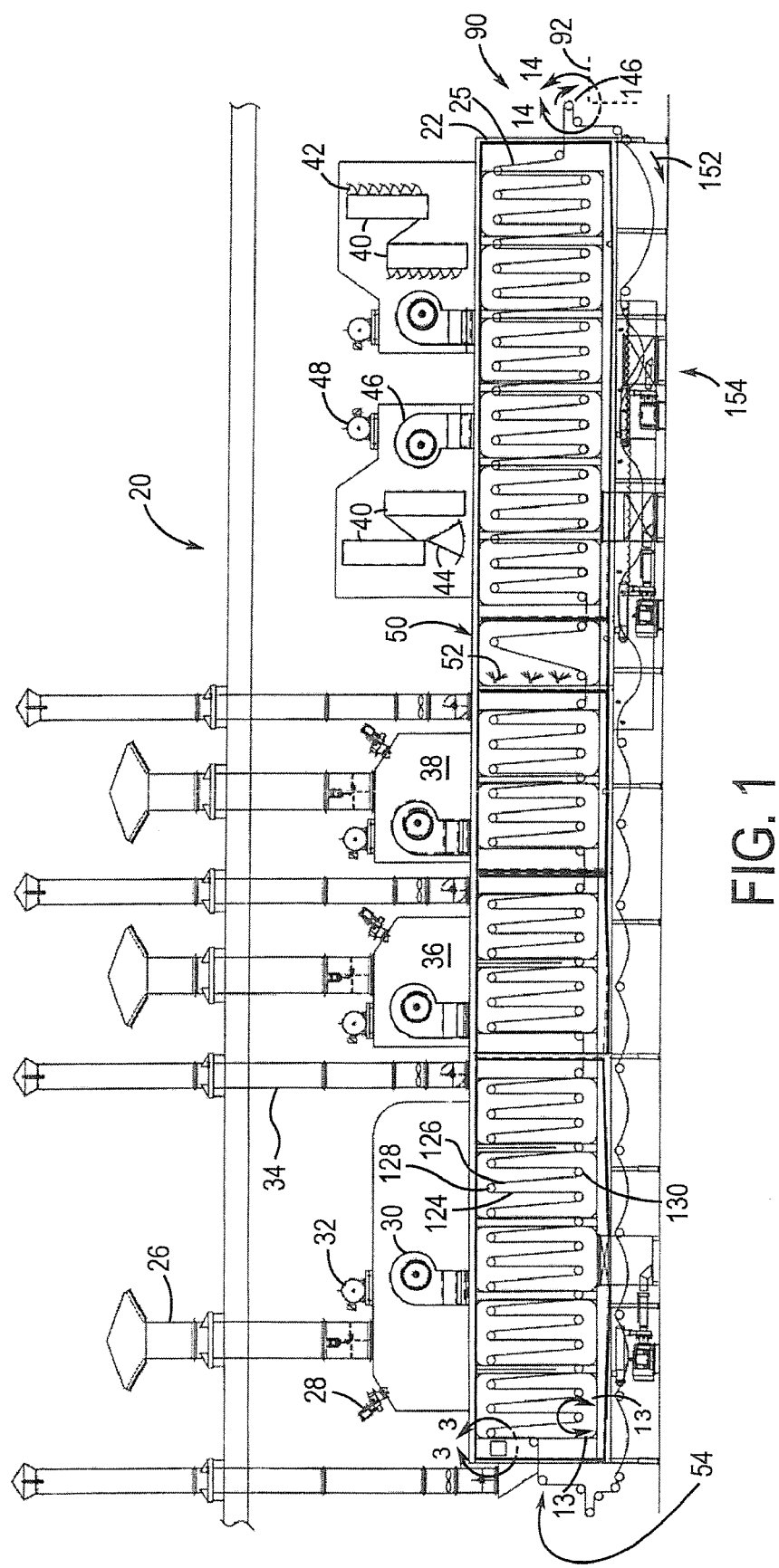
FIG. 1 is a side elevation view partially cut away of a food processing system in accordance with the parent invention.
Figure 2:
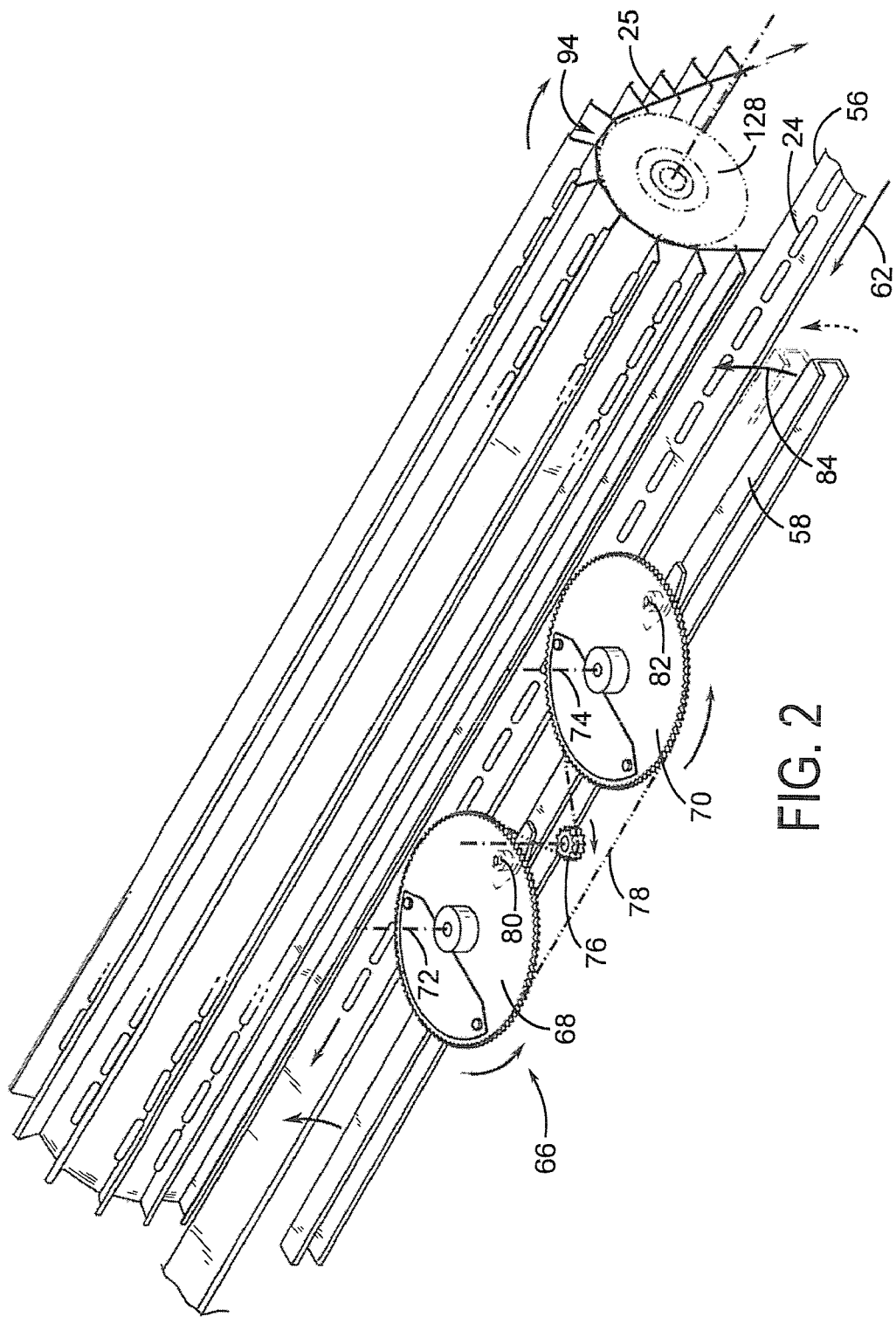
FIG. 2 is an enlarged perspective view of a portion of FIG. 1, at the loading station.
Figure 16:
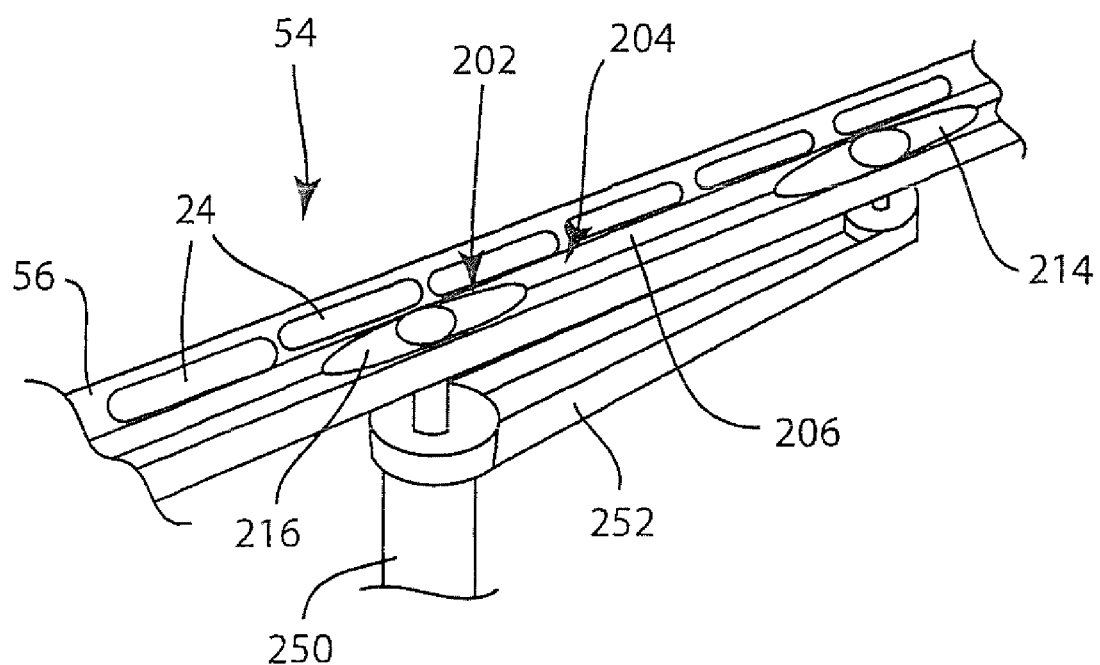
Figure 17:
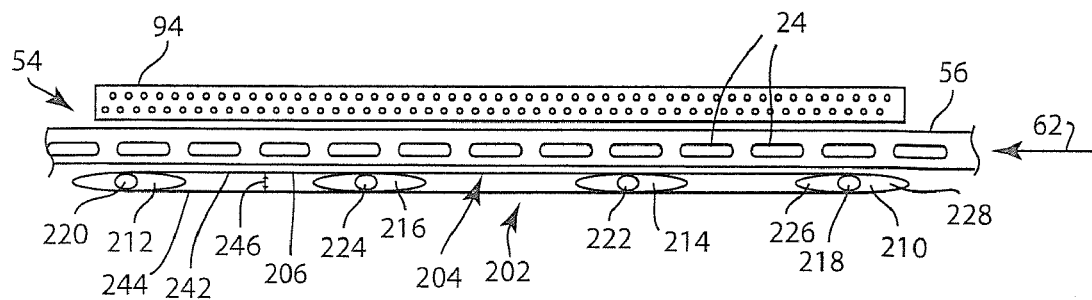
Figure 18:
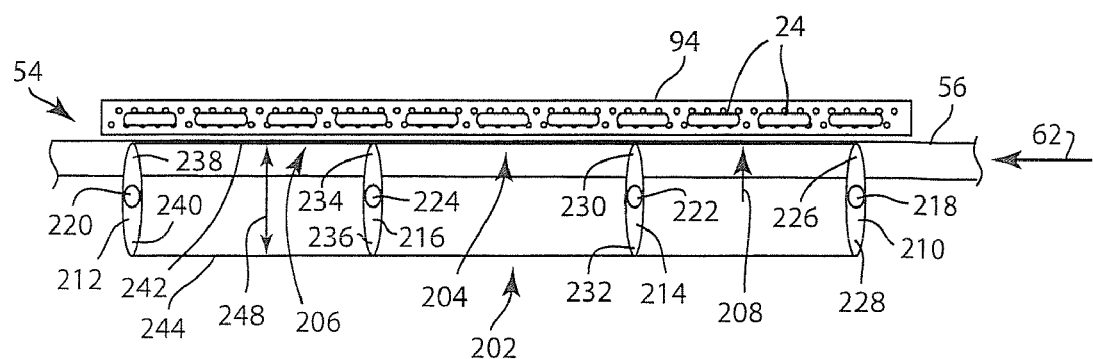
Figure 19:
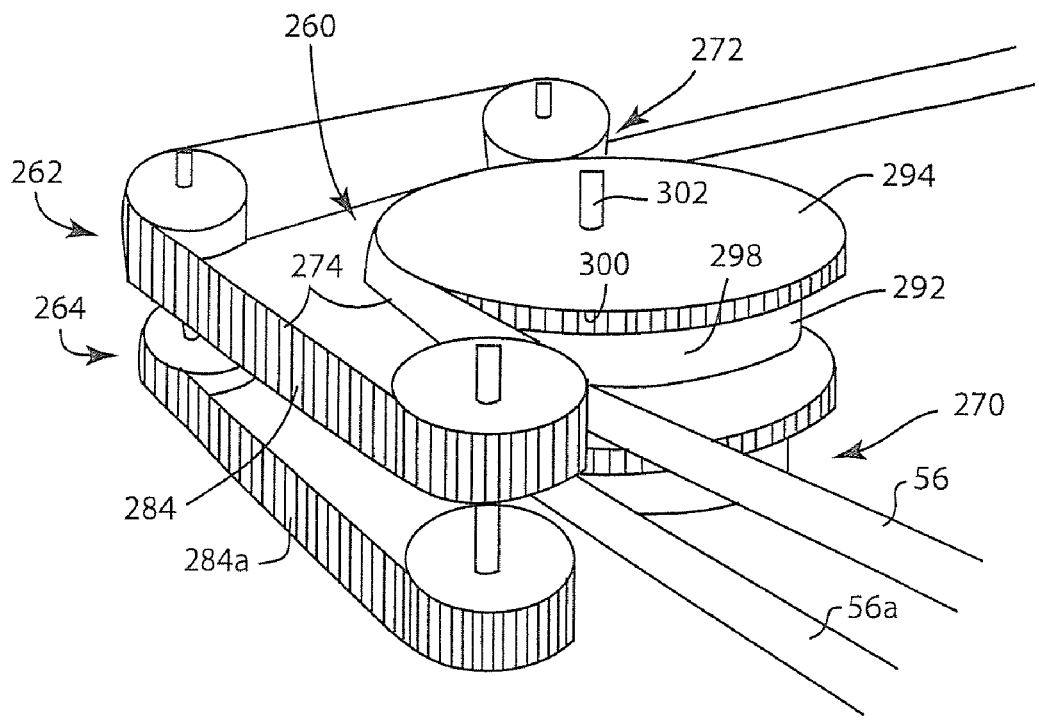
Figure 20:
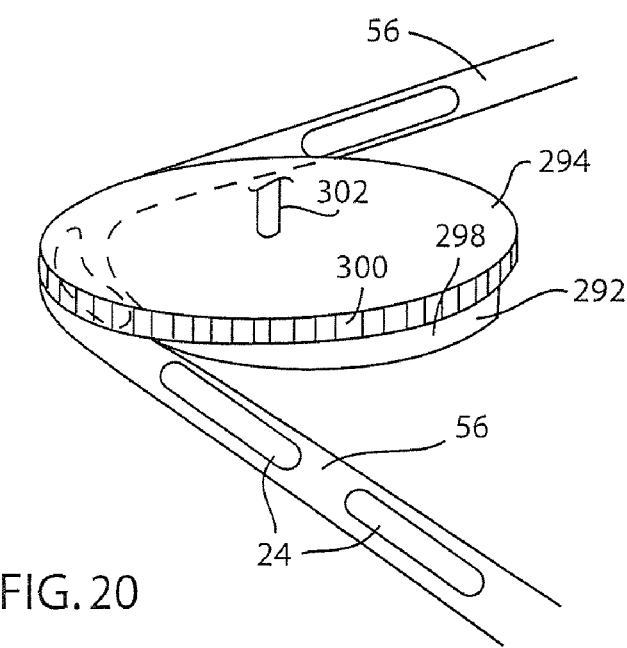
Figure 21:
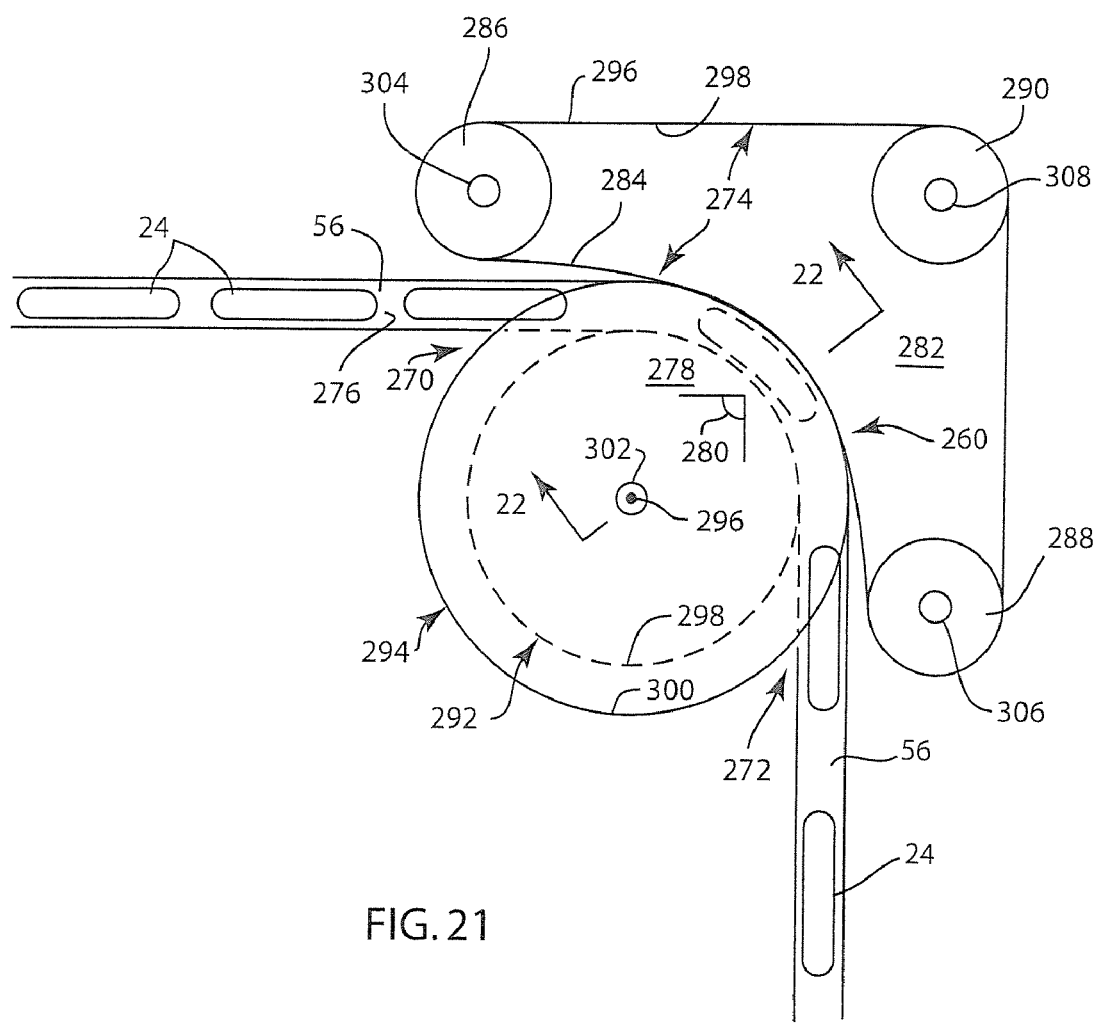
Figure 22:
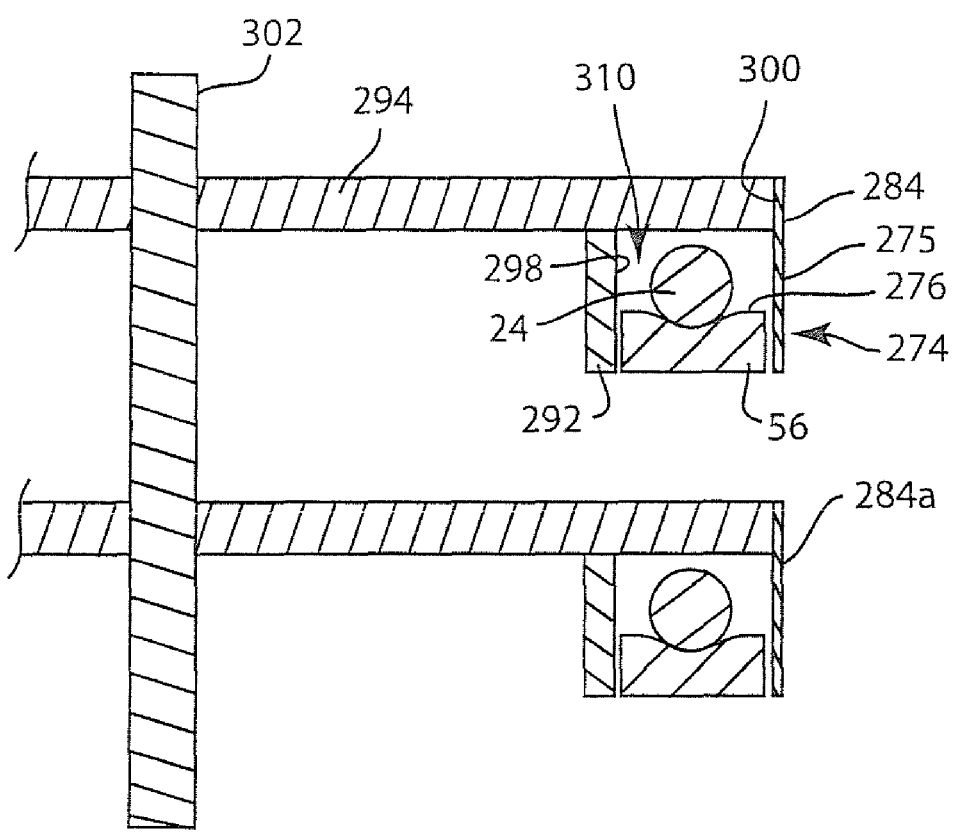
Figure 23:
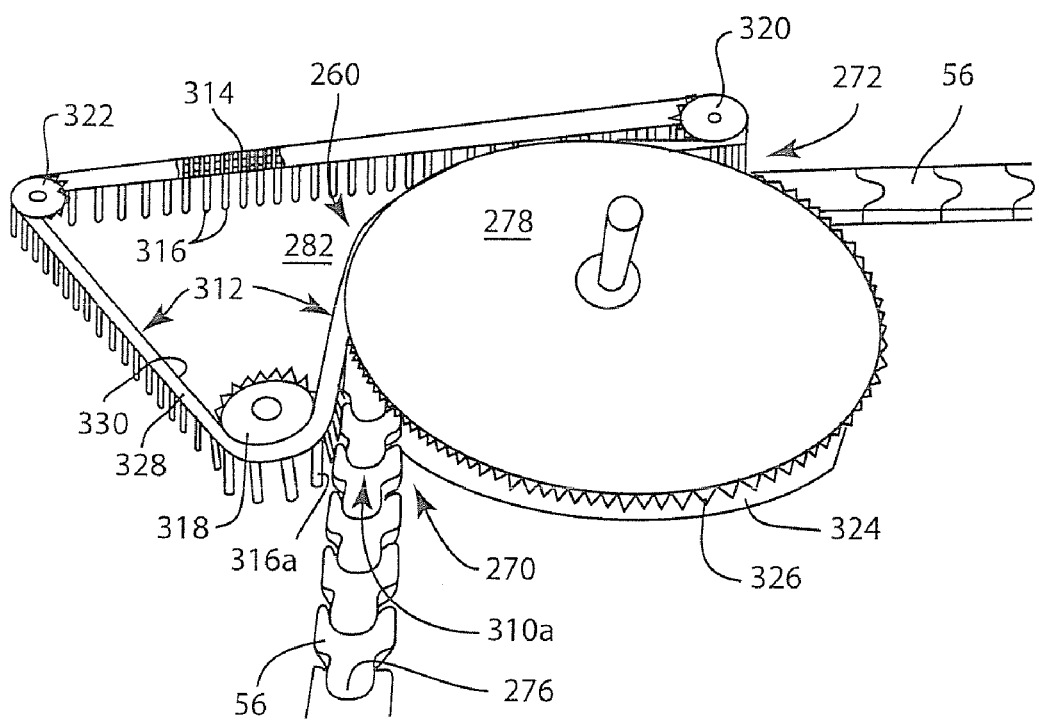
Figure 24:
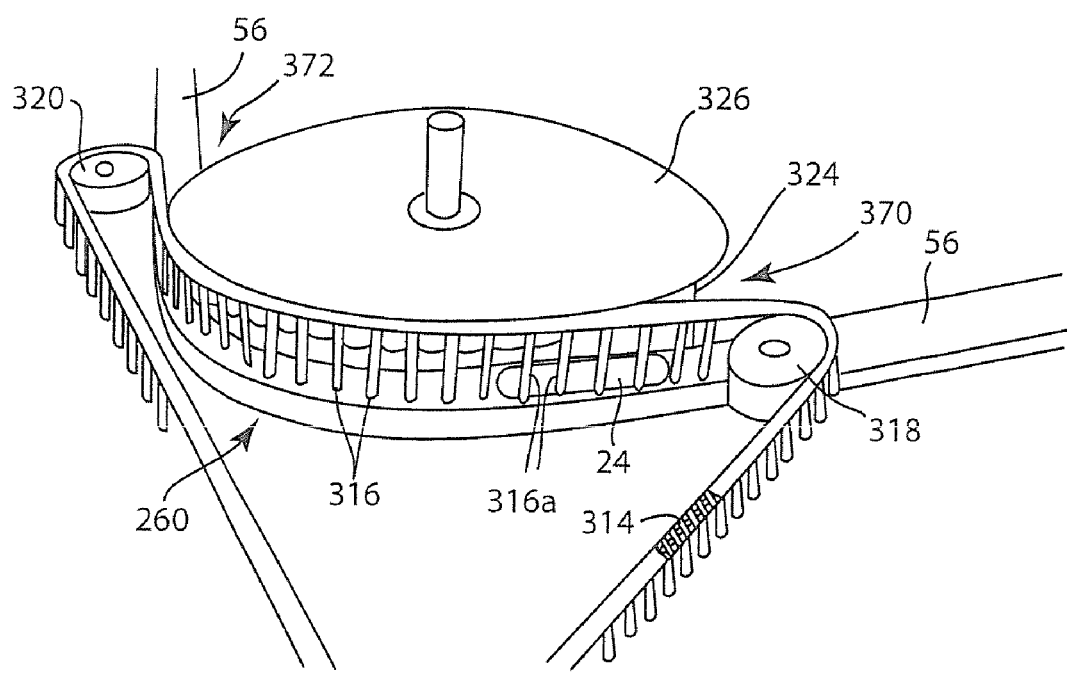
Figure 25:
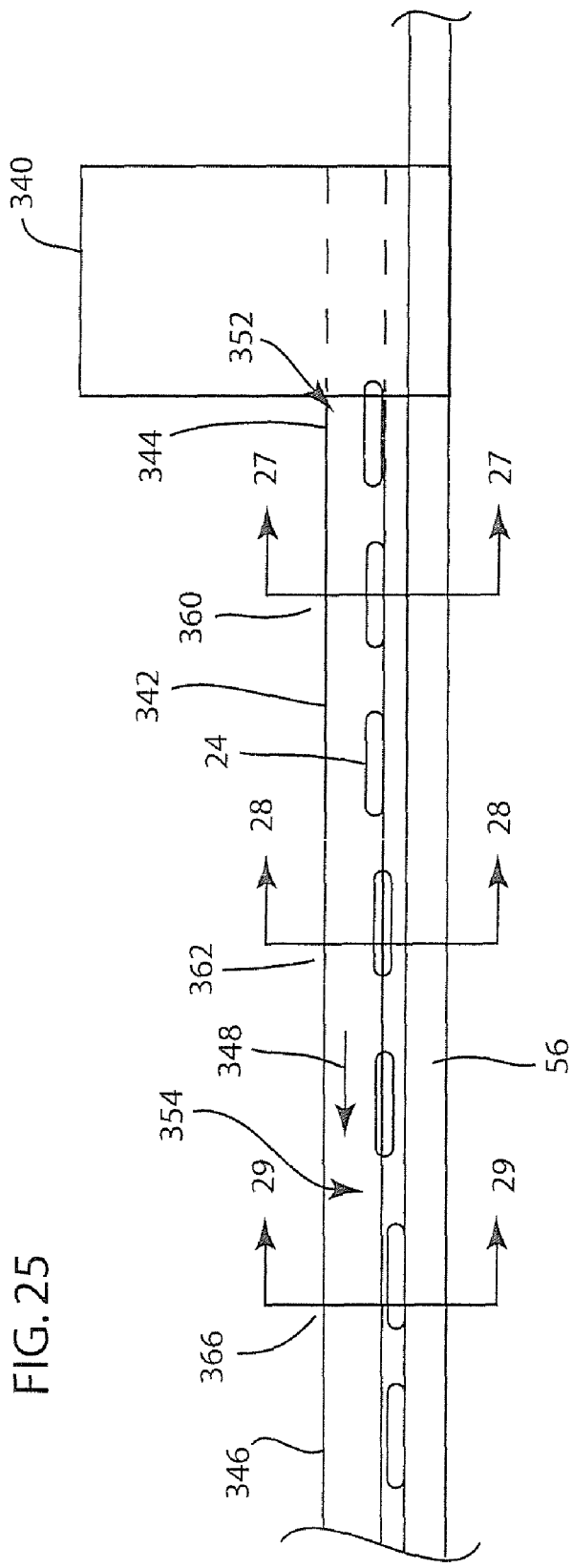
Figure 26:
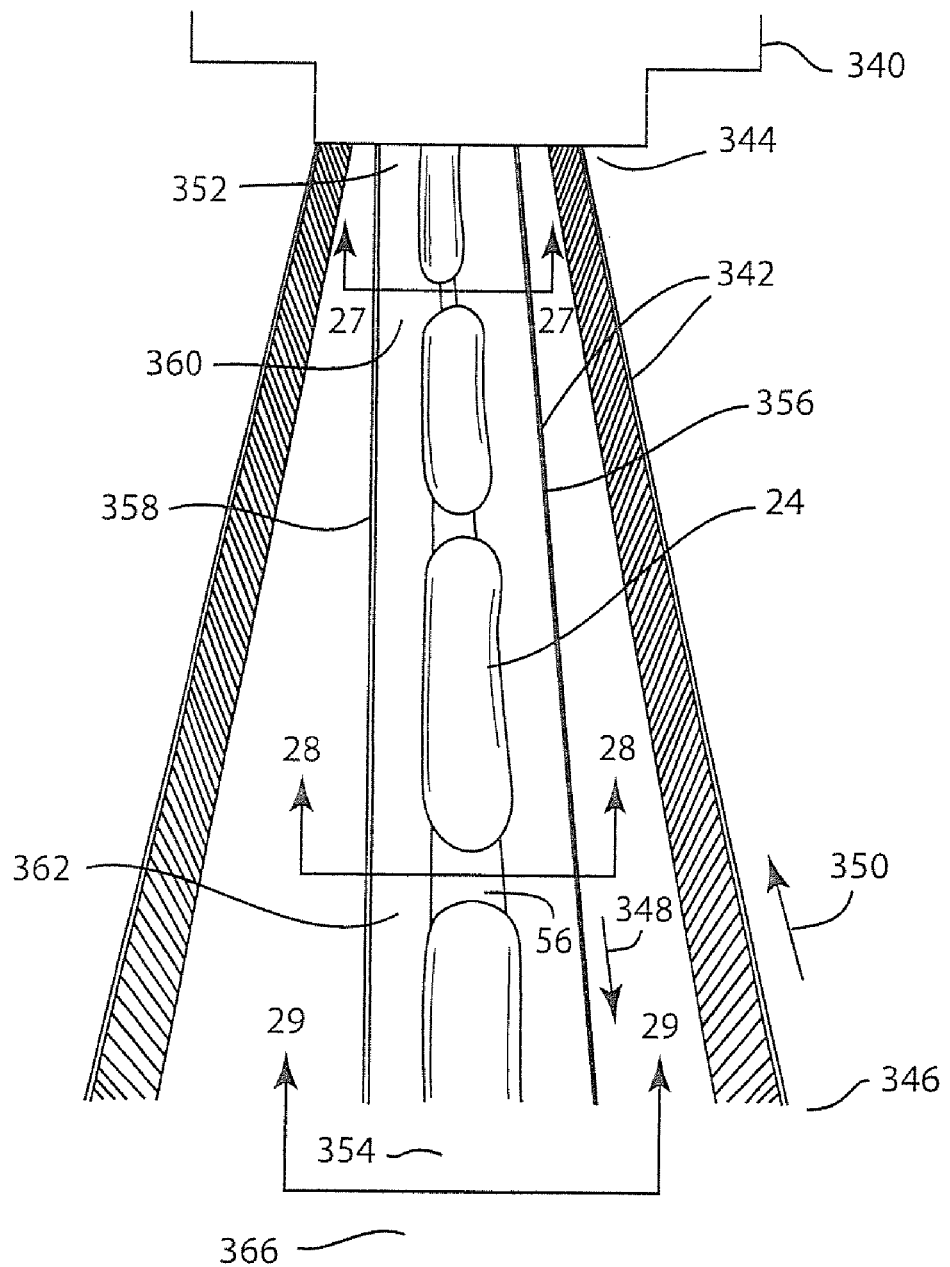
Figure 29:
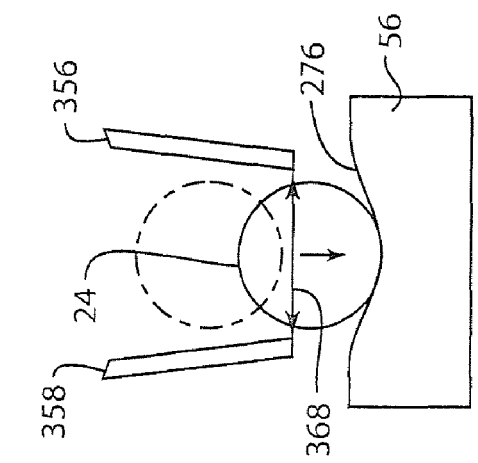
Figure 28:
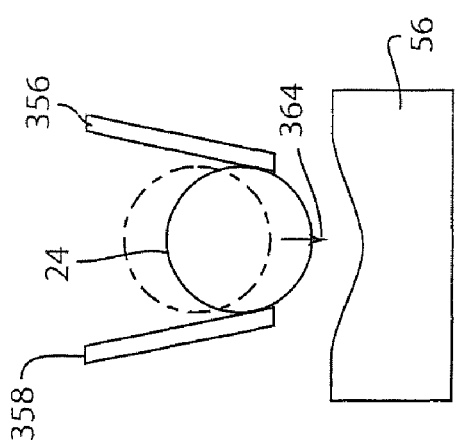
Figure 27:
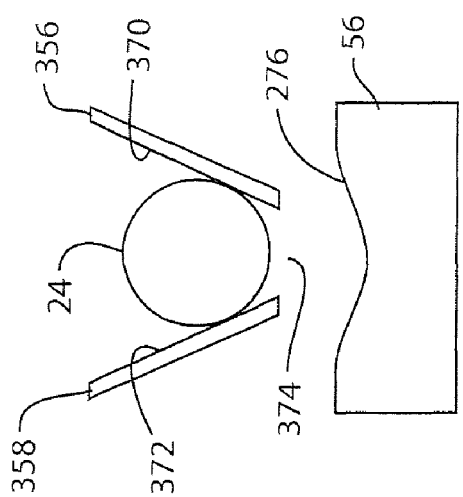
Figure 30:
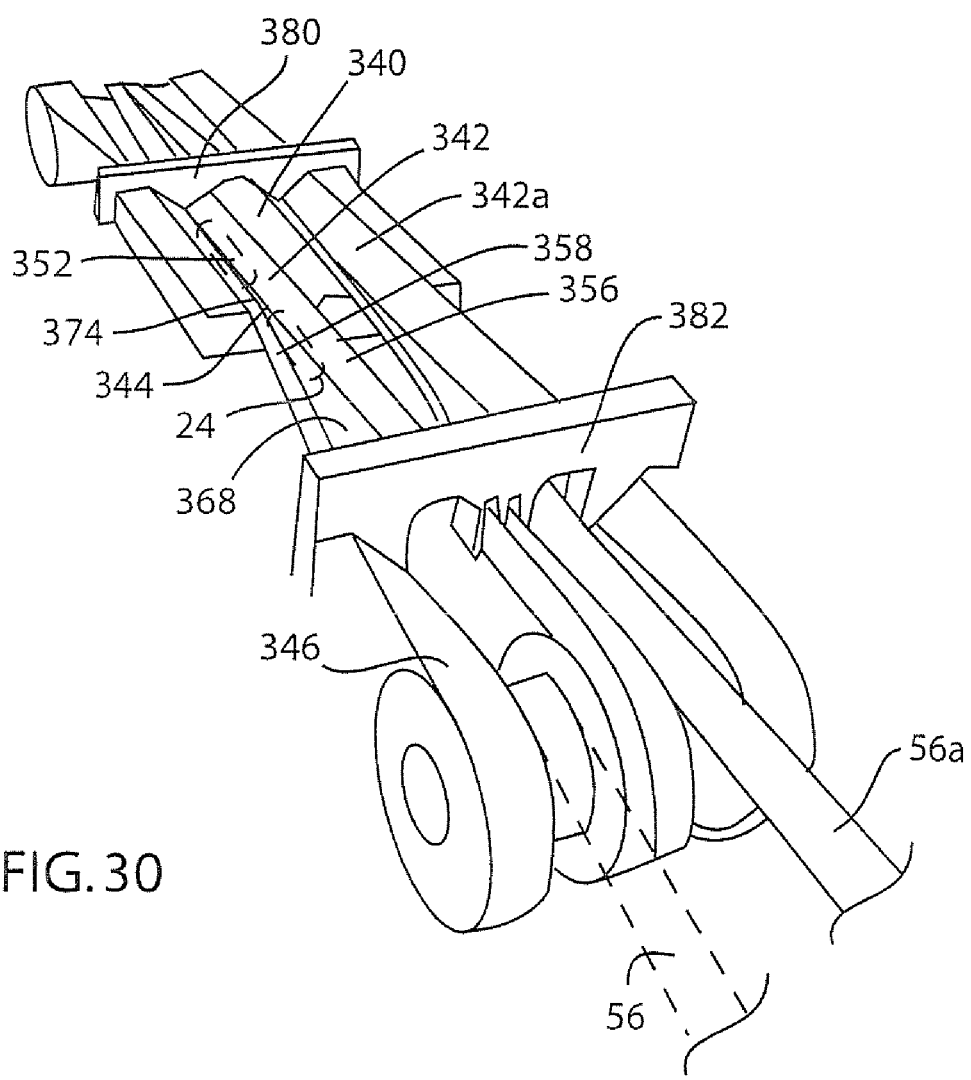

FIG. 16 is perspective view of a portion of FIG. 1 at the loading station, similar to FIG. 2, but showing the present invention.
FIG. 17 is a top elevation view of the loading system of FIG. 16.
FIG. 18 is like FIG. 17 and illustrates a further operational position.
FIG. 19 is a perspective view illustrating conveyance around a turn in accordance with the invention.
FIG. 20 shows a portion of FIG. 19 partially cut away.
FIG. 21 is a top elevation view of the system of FIG. 19.
FIG. 22 is a sectional view taken along line 22-22 of FIG. 21.
FIG. 23 is a perspective view of an alternate embodiment of a conveyance turn system in accordance with the invention.
FIG. 24 is an enlarged view from another angle of a portion of FIG. 23.
FIG. 25 is side elevation view of a conveyor to conveyor transfer system in accordance with invention.
FIG. 26 is a perspective view from above of a portion of the system of FIG. 25.
FIG. 27 is a sectional view taken along lines 27-27 of FIGS. 25 and 26.
FIG. 28 is a sectional view taken along lines 28-28 of FIGS. 25 and 26.
FIG. 29 is a sectional view taken along lines 29-29 of FIGS. 25 and 26.
FIG. 30 is a perspective view of a further embodiment of the system of FIG. 25.

DETAILED DESCRIPTION

Parent Invention

Figure 11:
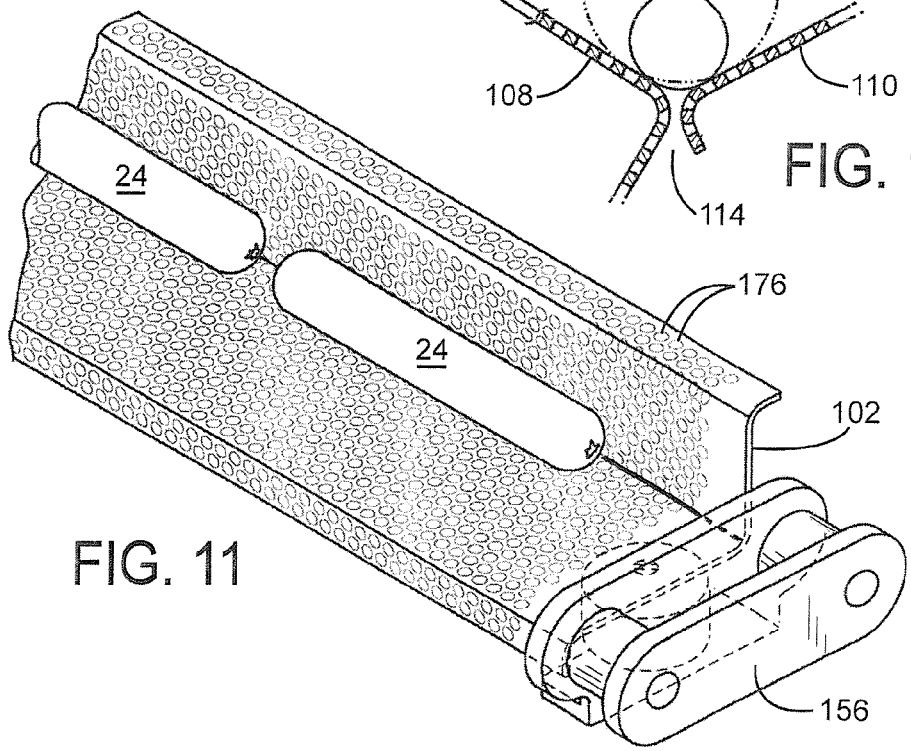
FIG. 11 is an enlarged perspective view of a portion of FIG. 1.
Figure 13:
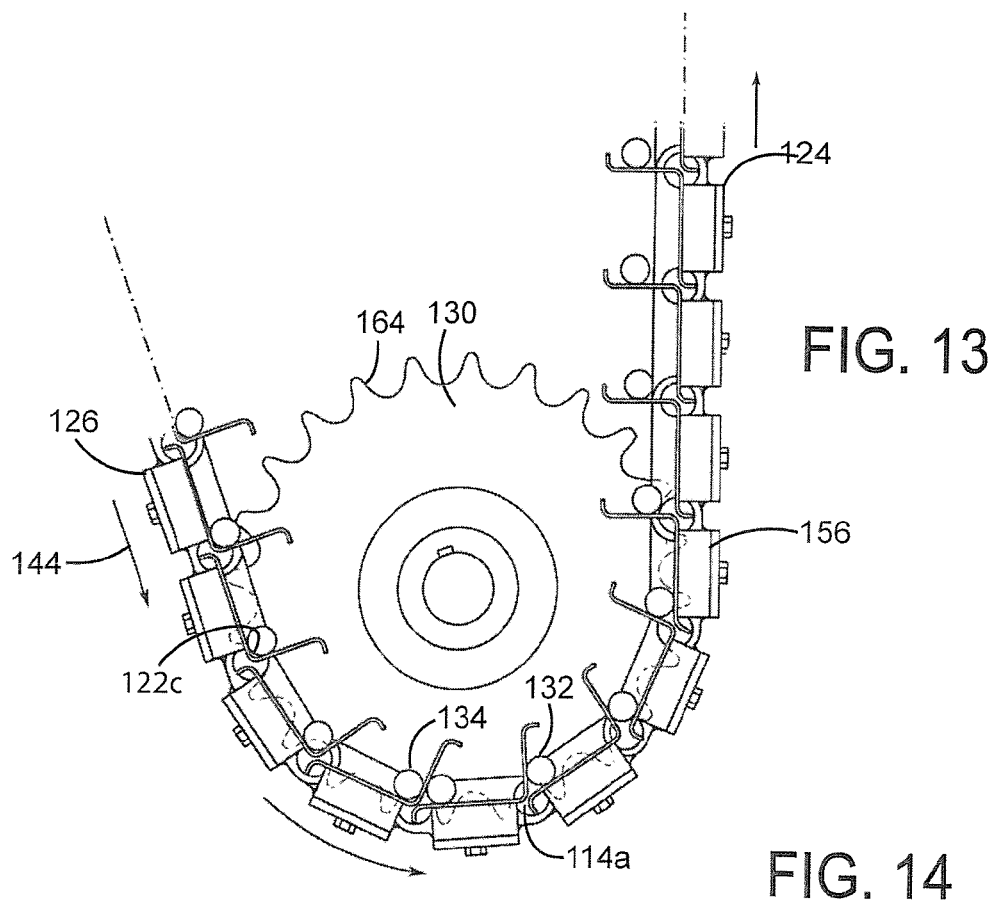
FIG. 13 is an enlarged view taken along line 13-13 of FIG. 1.

FIG. 1 shows food processing apparatus 20 including a food processing chamber 22 for processing a food product 24, FIGS. 2, 11, such as meat products, e.g. hot dogs, sausage, poultry, fish, or other food products. The food product is transported through chamber 22 by a conveyor 25, preferably a serpentine conveyor. Food processors with continuous serpentine chain conveyors are known in the prior art, for example U.S. Pat. Nos. 4,138,860, 4,277,954, 4,329,850, 4,784,053, 5,253,569, all incorporated herein by reference. Also known in the prior art are various processing and circulating systems and compartments for providing cooking heat by steam, hot water, hot air or the like, and chilling by a tap water shower, recirculated brine or glycol, cooled air or the like, for example the noted incorporated U.S. Pat. No. 5,253,569. Such heating, cooling and circulation systems may include, for example, a fresh air inlet such as 26, a source of heat such as a gas burner 28, a blower such as 30 driven by a motor such as 32 for circulating heated air through one or more compartments through which the serpentine conveyor travels, and an exhaust such as 34. The heating and circulation system may be repeated in further compartments such as shown at 36, 38. The systems may further include refrigeration coils such as 40 having defrost dampers such as 42 and balancing dampers such as 44 for providing and directing cooling chilling air as circulated by blowers such as 46 driven by motors such as 48, all as is known in the prior art. The heating and chilling zones may be separated by a shower zone such as 50 having shower nozzles such as 52 for pre-cooling the food product after the heating zone and prior to the chilling zone, as is known in the prior art.

The food product is loaded onto conveyor 25 at loading station 54, FIGS. 1-9. Another conveyor 56 delivers the food product serially to loading station 54. In one embodiment, conveyor 56 delivers food product from a system, such as a sausage making machine sold by Townsend Engineering Co. under their trademark KONTURA. At the loading station, a serial-to-parallel transfer loading delivery system, to be described, transfers food product 24 in parallel from conveyor 56 to conveyor 25. The food product is a plurality of food items 24 delivered end-to-end on conveyor 56 to loading station 54. The serial-to-parallel transfer loading delivery system includes a transfer bar 58 transferring a plurality of food items 24 simultaneously to conveyor 25 from conveyor 56. Conveyor 56 continuously delivers food items 24 to loading station 54 and continuously travels through the loading station. Transfer bar 58 transfers food items in batches to conveyor 25 without halting conveyor 56. This provides fast, efficient operation and overcomes prior disadvantages when it is necessary to stop conveyor 56 to enable loading of the food product into processing chamber 22. Transfer bar 58 moves into and out of the path of movement of food items 24 carried on conveyor 56. Transfer bar 58 moves at a speed equal to or greater than conveyor 56 such that transfer bar 58 engages and transfers a batch of food items to conveyor 25, including the last food item in series in the batch, and then retracts out of the path of movement of the food items before the serially successive next food item.

Figure 3:
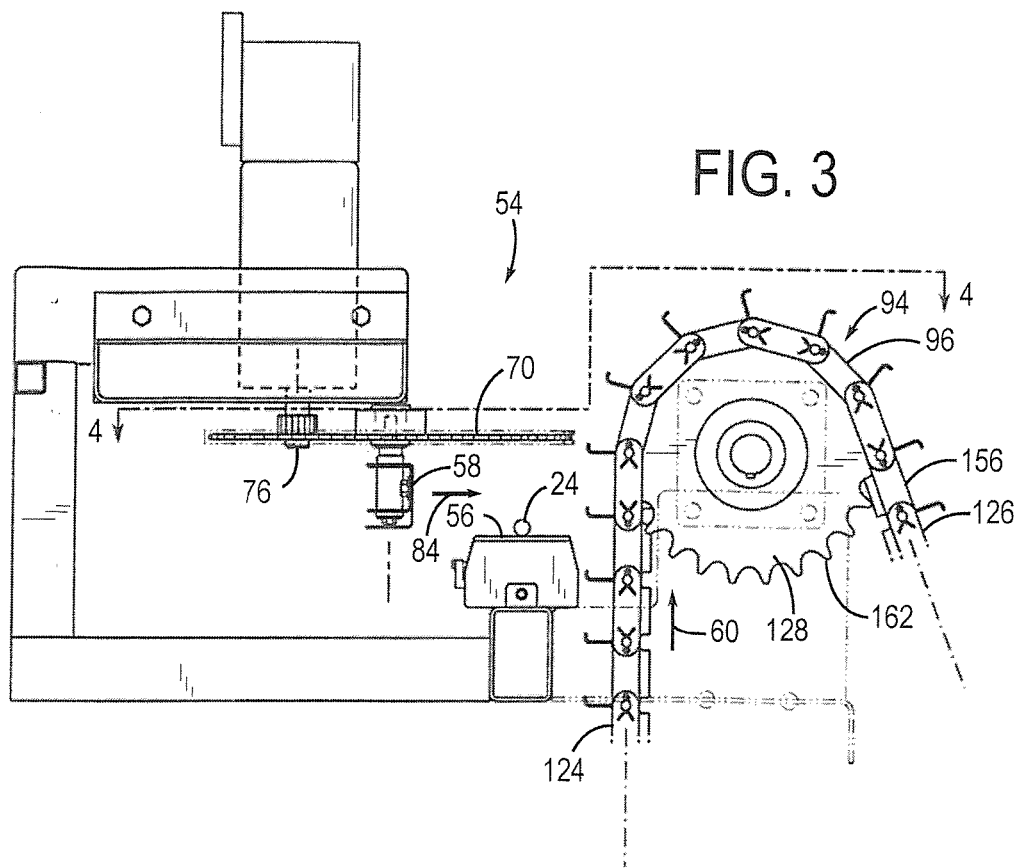
FIG. 3 is an enlarged view taken along line 3-3 of FIG. 2.
Figure 8:
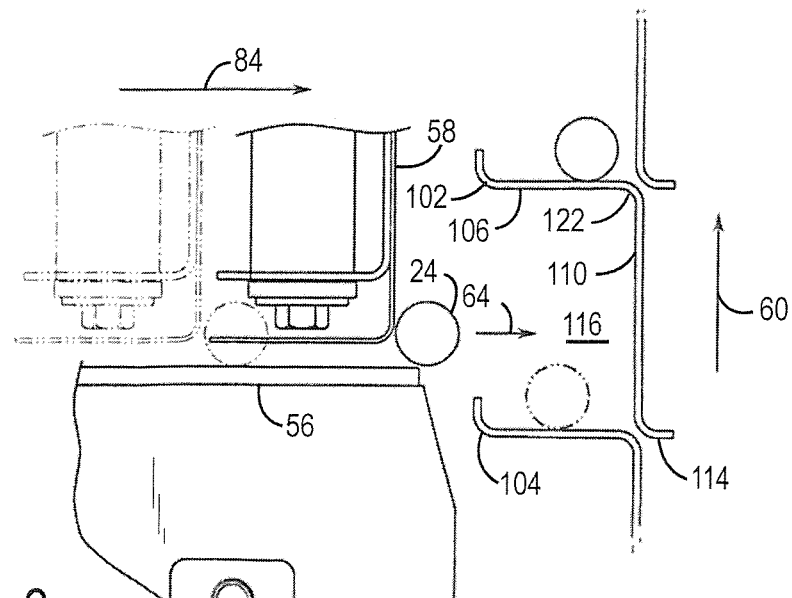
FIG. 8 is an enlarged view of a portion of FIG. 7.
Figure 5:
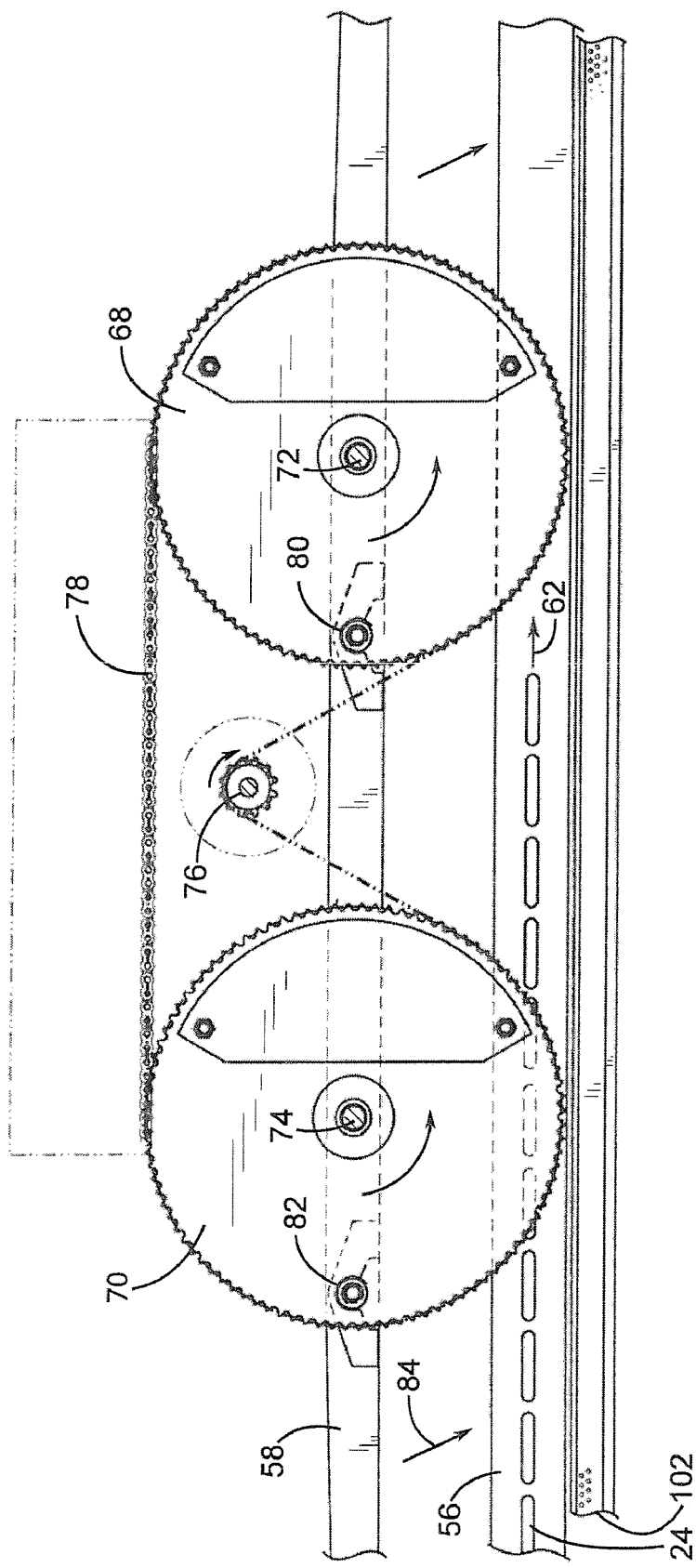
FIG. 5 is an enlarged view of a portion of FIG. 4.
Figure 6:
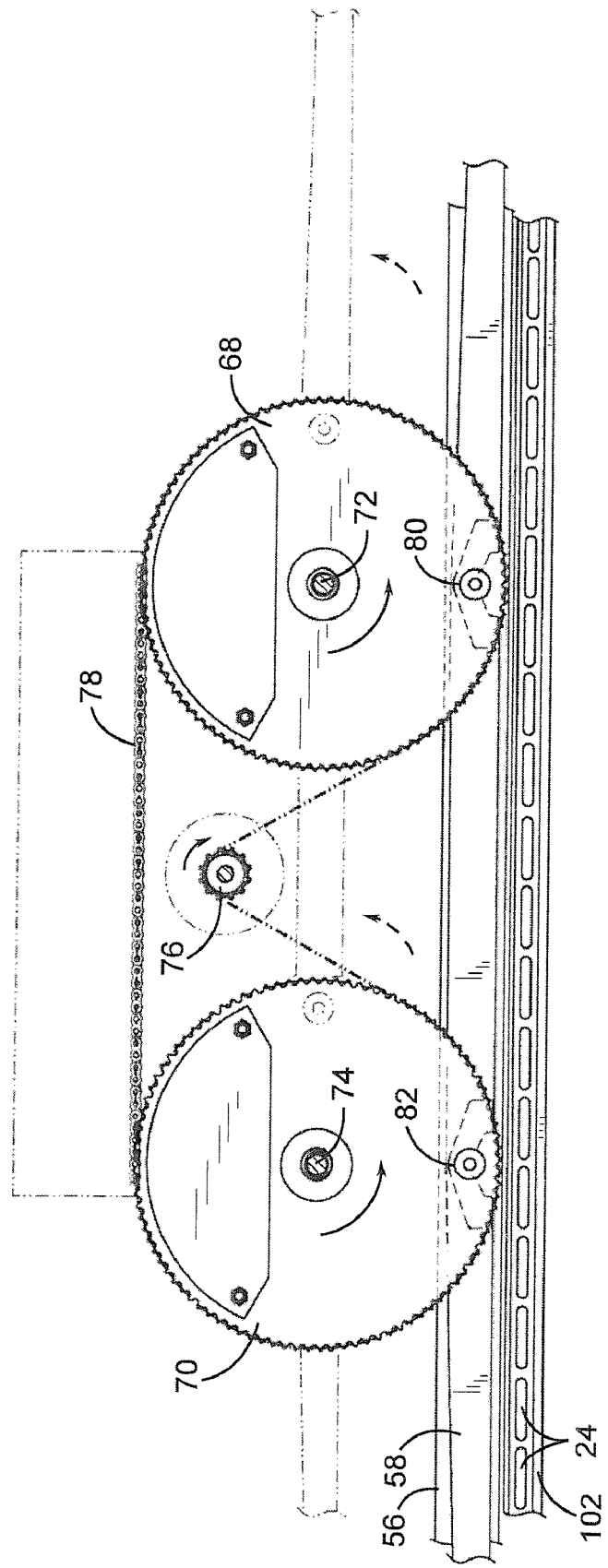
FIG. 6 is like FIG. 5 and illustrates another operational position.
Figure 7:
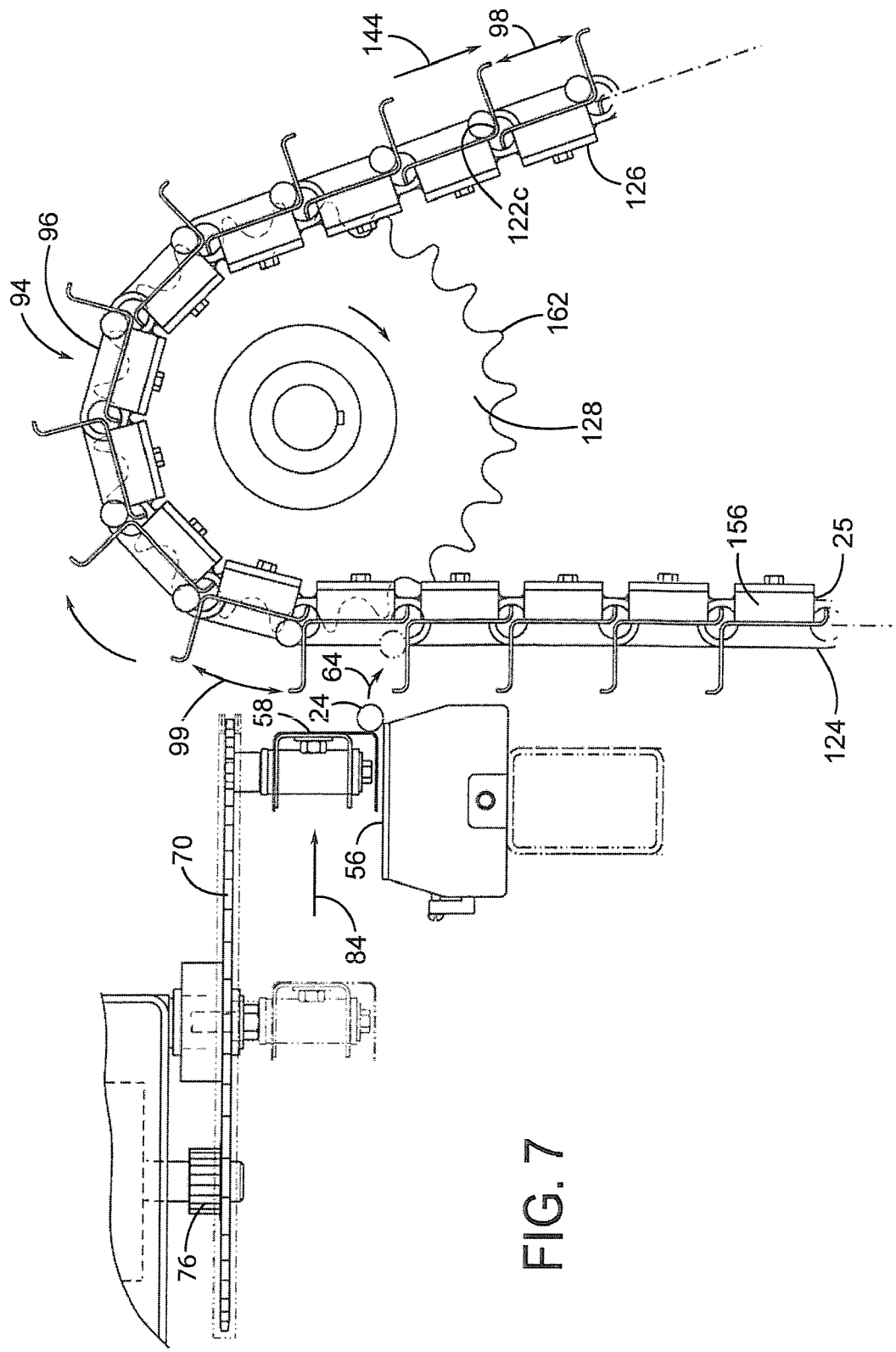
FIG. 7 is an enlarged view of a portion of FIG. 3 and illustrates operation.
Figure 9:
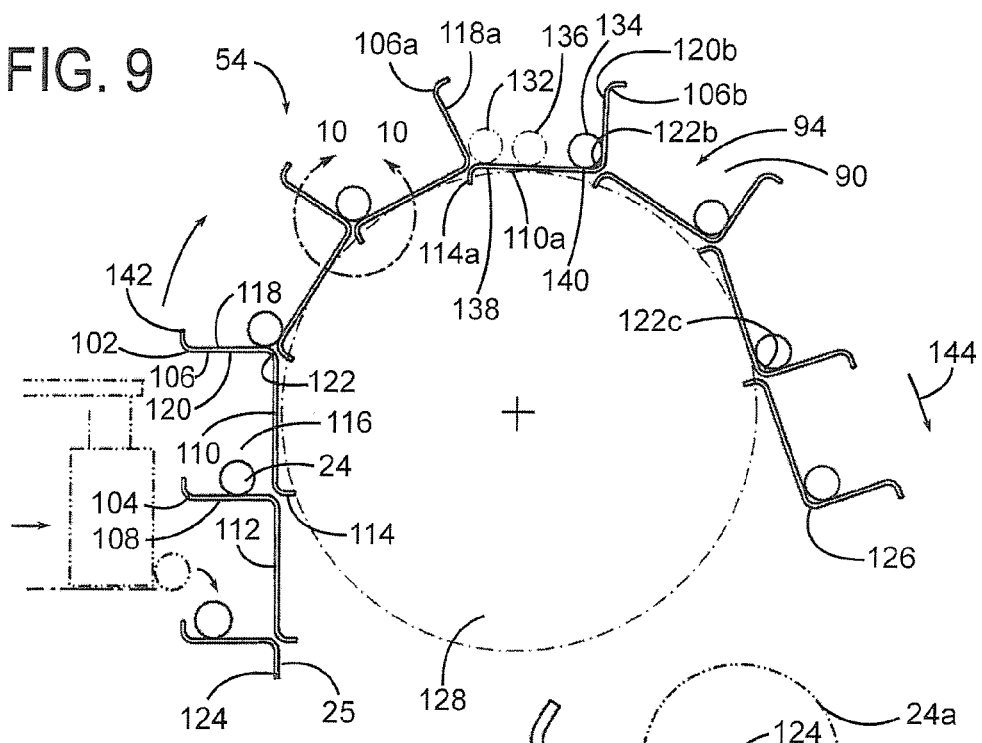
FIG. 9 schematically illustrates operation of the structure of FIG. 7.

Conveyor 25 travels through loading station 54 in a first direction 60, FIGS. 3, 8. Conveyor 56 travels through the loading station in a second direction 62, FIGS. 2, 5. Transfer bar 58 transfers the food product from conveyor 56 to conveyor 25 in a third direction 64, FIG. 8. Each of the noted first, second and third directions is transverse to each other. A transfer mechanism 66, FIG. 2, is provided by a pair of rotary disks 68, 70, each rotation about a respective rotational axis 72, 74. Transfer bar 58 is journaled to each of the disks and translated thereby for reciprocal movement into and out of the path of movement of food product 24 on conveyor 56. The transfer mechanism includes a drive train, such as a drive spindle 76, and a belt 78, preferably a chain belt, trained around rotary disks 68, 70 and drive spindle 76 for rotating the disks in response to rotation of the drive spindle. Transfer bar 58 is journaled to each of disks 68, 70 at a respective journal point 80, 82, FIG. 5, spaced radially outwardly of the respective rotational axis 72, 74, such that rotation of disks 68, 70 drives transfer bar 58 from a retracted position, FIG. 5, to an extended position, FIG. 6. In FIG. 4, the retracted position of transfer bar 58 is shown in solid line, and the extended position is shown in phantom. In FIG. 6, the retracted position is shown in phantom, and the extended position is shown in solid line. In FIG. 7, the retracted position is shown in phantom, and the extended position is shown in solid line. Each journal point 80, 82 moves in a circle. Transfer bar 58 moves in an arc having a vector component into and out of the path of movement of food product 24 on conveyor 56 transverse to the noted first direction 60 and to the noted second direction 62, and having a vector component also pushing food product 24 from conveyor 56 forwardly, arrow 84, FIGS. 2, 5, in the same direction thereof onto conveyor 25, such that rotation of disks 68, 70 translate transfer bar 58 to transfer food product 24 transversely from conveyor 56, as shown at arrow 64, FIGS. 7, 8, and also forwardly therefrom and in the same direction thereof from conveyor 56 to conveyor 25, as shown at arrow 84 in FIGS. 2 and 5.

Figure 14:
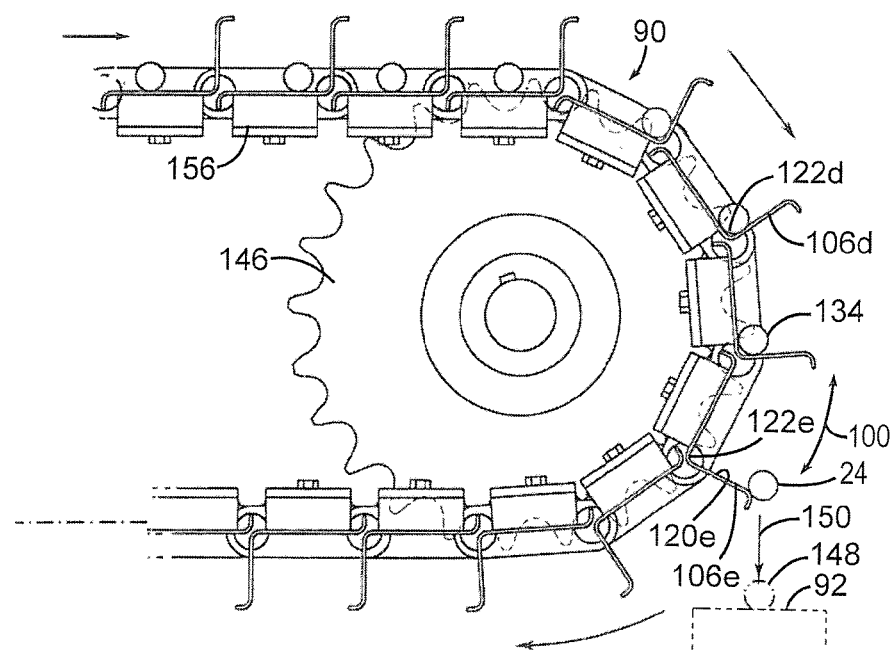
FIG. 14 is an enlarged view taken along line 14-14 of FIG. 1.

Serpentine conveyor 25 transports food product 24 through chamber 22 from loading station 54 to unloading station 90 where the food product is discharged to another conveyor such as shown in phantom at 92 in FIG. 1. A plurality of food product cradles 94, FIGS. 2, 7, 9, carry food product 24 through chamber 22 from loading station 54 to unloading station 90. Each cradle has an opening 96 receiving food product 24 at loading station 54 and discharging the food product at unloading station 90. The opening has a width 98, FIG. 7 which varies during traversal of conveyor 25 from a loading station 54 to unloading station 90. The width 98 of opening 96 becomes wider at unloading station 90 as shown at increased width 100, FIG. 14. Cradle 94 is provided by two pieces, namely a leading food product carrier 102, FIG. 9, and a trailing food product carrier 104. Each carrier has a first segment 106, 108, respectively, and a second segment 110, 112, respectively. Cradle 94 is formed by the second segment 110 of the leading food product carrier and the first segment 108 of the trailing food product carrier immediately therebehind. Second segment 110 of the leading food product carrier is separated from the first segment 108 of the trailing food product carrier by a gap 114. Gap 114 is distally oppositely spaced from opening 96 by a food product cavity 116 containing food product 24 therein. The width of opening 96 and the orientation of gap 114 vary during traversal of conveyor 25 from loading station 54 to unloading station 90.

Figure 10:
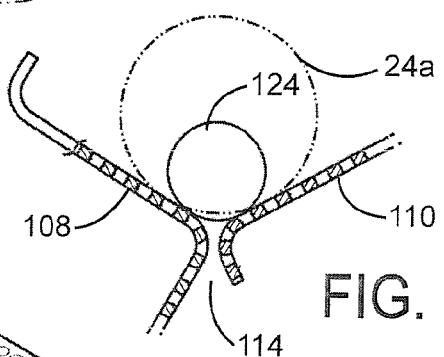
FIG. 10 is a view taken along line 10-10 of FIG. 9.

The noted plurality of two-piece food product cradles 94 are each formed by the noted second segment 110 of a leading food product carrier 102 and the first segment 108 of a trailing food product carrier 104 immediately therebehind. The second segment 110 of the leading food product carrier is separated from the first segment 108 of the trailing food product carrier by the noted gap 114. Food product 24 is carried, FIG. 10, by both the second segment 110 of the leading food product carrier and the first segment 108 of the trailing food product carrier and spans gap 114 during designated portions of the travel path of conveyor 25. Gap 114 has a width less than the width of food product 24 such that the food product cannot fall through gap 114 in cradle 94, including for large food items as shown in phantom at 24a in FIG. 10, and smaller food items as shown in solid line at 24 in FIG. 10. The noted first segment of each food product carrier has first and second opposite faces 118 and 120. First face 118 faces forwardly toward the next food product carrier thereahead. Second face 120 faces aft toward the next food product carrier therebehind. Second face 120 meets the noted second segment 110 at a junction 122.

Conveyor 25 has a plurality of upwardly traveling flights such as 124, FIGS. 1, 3, 7, 9, 13, and a plurality of downwardly traveling flights 126 joined by upper and lower loops 128, 130, respectively. Food product 24 changes from a first position 132, FIG. 9, to a second position 134 as the conveyor travels around a respective loop such as 128. The food product in position B 132 is carried by the second segment 110a of a leading food product carrier and the first face 118a of the first segment 106a of a trailing food product carrier and spans gap 114a therebetween. The food product in the second position 134 is carried by the second segment 110a and the second face 120b of the first segment 106b of the same carrier at junction 122b. In the case of a cylindrical food product, such as a hot dog or sausage, the food product rolls as shown at 136 from first position 132 to second position 134. Second segment 110 of the carrier is flat to facilitate the noted rolling and to minimize surface area contact with food product 24, touch-marks on the food product, and tendency of the food product to stick to the carrier, for example as otherwise caused by curved or concave food product carriers which have larger surface area contact and hence larger touch-marks, and also greater tendency to stick to the food product.

Food product 24 changes from the noted first position 132 to the noted second position 134 as conveyor 25 travels around an upper loop 128. Food product 24 changes from the noted second position 134 to the noted first position 132 as conveyor 25 travels around a lower loop 130, FIG. 13. Food product 24 in the noted first position 132 is carried by two food product carriers, namely the second segment 110a of a leading food product carrier and the first face 118a of the first segment 106a of the immediately trailing food product carrier. Food product 24 in the second position 134 is carried by one food product carrier, namely the second segment 110a of the one food product carrier and the second face 120b of the first segment 106b of the same such one food product carrier. Food product 24 changes location along the noted second segment 110a between the noted first and second positions 132 and 134. Food product 24 in the first position 132 engages second segment 110a at a first location 138 therealong. Food product 24 in the noted second position 134 engages second segment 110a at a second location 140 therealong.

In the preferred embodiment, each food product carrier is L-shaped and has a first leg providing first segment 106, and a second leg providing second segment 110. The first leg at 106 extends substantially horizontally during travel of conveyor 25 in upward flight 124. The second leg at 110 extends substantially vertically during travel of conveyor 25 in upward flight 124. The first and second legs meet at the noted junction 122. The first leg has an upwardly turned lip 142 at the end thereof opposite junction 122. Lip 142 is turned to extend from first leg 106 in a direction opposite to second leg 110, such that lip 142 extends upwardly during travel of conveyor 25 in upwardly traveling flight 124. Travel of conveyor 25 along downward flight 126 is along a given downward angle as shown at arrow 144, FIGS. 7, 9, 13, such that food product 24 is carried at the junction of the noted legs, for example as shown at junction 122c. Food product 24 changes positions between loading station 54 and unloading station 90. Food product 24 is in the noted first position 132 at the loading station, and is in the noted second position 134 at the unloading station. The conveyor traverses around a discharge loop 146, FIGS. 1, 14, at the unloading station. The noted junction 122 changes from an upwardly facing orientation as shown at 122d to a downwardly facing orientation as shown at 122e, including a change in orientation of first segment 106 from upwardly angled as shown at 106d to downwardly angled as shown at 106e. Food product 24 falls by gravity along and exits from downwardly angled first segment 106e, and then falls on conveyor 92 as shown in phantom at 148 and at arrow 150. Food product 24 engages the second face as shown at 120e of the first segment as shown at 106e at unloading station 90 and discharges therealong at discharge loop 146. Food product 24 engages the first face as shown at 118 in FIG. 9 of the first segment 106 at loading station 54.

Conveyor 25 has a return path as shown at arrow 152, FIG. 1, from unloading station 90 to loading station 54 external of chamber 22. In preferred form, each of the noted first and second segments 106 and 110 of the food product carriers are flat. A washing station 154 is provided external to chamber 22 and along return path 152 for washing the food product carriers. The noted flat conveyor segments 106, 110, etc. facilitate access of the washing station and the washing spray therefrom to the food product carriers and rinsing thereof to facilitate removal of food product remnants.

Figure 15:
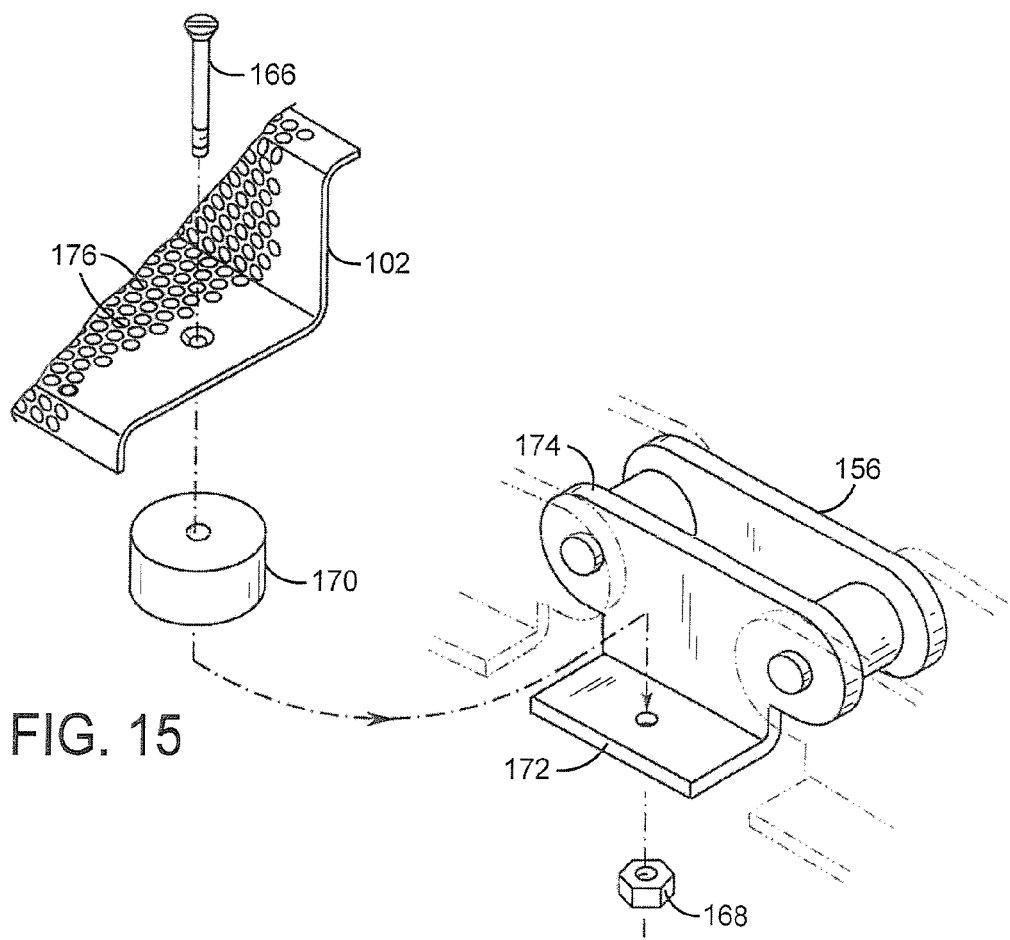
FIG. 15 is an exploded perspective view of the structure of FIG. 11.

The conveyor is preferably provided by a pair of transversely spaced chains 156, 158, FIGS. 3, 4, 7, 11-15, driven by a motor drive 160 and traversing around upper and lower sprockets 162 and 164 providing the noted upper and lower loops 128 and 130, respectively. The food product carriers 102, etc., FIGS. 15, 11, 12, are mounted by respective bolts 166 and nuts 168 and grommets 170 to a respective flange 172 on a respective chain link 174. Each food product carrier 102 is the noted L-shaped member and preferably perforated with a plurality of perforations 176 to facilitate circulation of the processing medium therethrough, such as steam, hot air, cold air, cold rinse, etc., to maximize contact of such processing medium with the food product, and also to minimize surface contact area of the carrier with the food product to in turn minimize touch-marks which are objectionable for final product appearance, and to minimize the noted sticking.

The system provides a method for processing a food product 24 including providing a food processing chamber 22, providing a first conveyor 25 for transporting the food product through the chamber, providing a loading station 54 for loading the food product onto the first conveyor, providing a second conveyor 56 for conveying the food product to the loading station, conveying the food product serially, e.g. end-to-end, on the second conveyor to the loading station, transferring the food product in parallel from the second conveyor to the first conveyor, and transporting the food product on the first conveyor through the chamber. The method further includes conveying a plurality of food items end-to-end from the second conveyor to the loading station, and transferring a plurality of food items simultaneously to the first conveyor from the second conveyor. The method includes continuously conveying the food items on the second conveyor to the loading station and transferring the food items in batches to the first conveyor without halting the second conveyor. The method includes providing a transfer bar transferring the food items from the second conveyor to the first conveyor, moving the transfer bar into and out of the path of movement of the food items on the second conveyor at a speed equal to or greater than the conveyance speed of the second conveyor such that the transfer bar engages and transfers a batch of food items to the first conveyor, including the last food item in series in the batch, and then retracts out of the path of movement of the food items before the serially successive next food item on the second conveyor. The method includes conveying the food product on the first conveyor through the loading station in a first direction, conveying the food product on the second conveyor through the loading station in a second direction, and transferring the food product from the second conveyor to the first conveyor in a third direction, wherein each of the noted first, second and third directions is transverse to each other.

The method further includes providing a plurality of food product cradles 94 on conveyor 25 for carrying food product 24 through chamber 22 from the loading station to the unloading station, providing each cradle with an opening 96 for receiving the food product at the loading station and discharging the food product at the unloading station, and including loading the food product on the conveyor at the loading station through the opening in the food product cradle, conveying the food product through the chamber on the conveyor, and discharging the food product from the conveyor at the unloading station through the opening in the cradle, and including varying the width 98 of the opening during traversal of the conveyor from the loading station to the unloading station. The method includes widening the opening to a wider width 100 at the unloading station. In a further embodiment, the food product is loaded onto conveyor 25 at a wider width opening such as 99, FIG. 7. The method further includes providing a plurality of food product carriers 102, 104, etc. on the conveyor, each carrier having a first segment 106, 108, etc., and a second segment 110, 112, etc., providing a plurality of two-piece cradles 94 each formed by the second segment of a leading food product carrier and the first segment of a trailing food product carrier immediately therebehind, separating the second segment of a leading food product carrier from the first segment of a trailing food product carrier by a gap 114, carrying the food product on both the second segment of a leading food product carrier and the first segment of a trailing food product carrier during designated portions of the travel path of the conveyor such that the food product spans the gap 114a. The method includes varying the orientation of the gap during traversal of the conveyor through the chamber. The method includes providing the first segment with first and second opposite faces 118, 120, the first face facing forwardly toward the next food product carrier thereahead, the second face facing aft toward the next food product carrier therebehind, the second face meeting the second segment at a junction 122. The method includes providing the conveyor with a plurality of upwardly traveling flights 124 and a plurality of downwardly traveling flights 126 joined by upper and lower loops 128 and 130, and further including changing the position of the food product from a first position 132 to a second position 134 as the conveyor travels around a respective loop, carrying the food product in the first position on the second segment and the first face of the first segment and spanning the gap, and carrying the food product in the second position on the second segment and the second face of the first segment at the junction. When the food product is cylindrical, the method further includes rolling (136) the food product between the first and second positions by gravity, and providing a flat second segment 110a to facilitate the rolling and minimize surface area contact with the food product and touch-marks on the food product and the noted sticking. The method further includes changing the food product from the first position to the second position as the conveyor travels around an upper loop, and changing the food product from the second position to the first position as the conveyor travels around a lower loop. The method further includes carrying the food product in the first position on two food product carriers, namely the second segment of a leading food product carrier and the first face of the first segment of the immediately trailing food product carrier, and carrying the food product in the second position on one food product carrier, namely the second segment of the one food product carrier and the second face of the first segment of the same such one food product carrier. The method further includes changing the location of the food product along the second segment between the first and second positions, the food product in the first position engaging the second segment at a first location 138 therealong, the food product in the second position engaging the second segment at a second location 140 therealong. In the preferred embodiment, the first and second segments meet at a junction 122, and the method further includes changing the position of the food product between the first and second positions as the conveyor traverses through the chamber, carrying the food product in the first position by the second segment of a leading food product carrier and the first segment of a trailing food product carrier and spanning the gap 114a therebetween, and carrying the food product in the second position by a single carrier, namely at the junction 122b of the first and second segments of the same such single carrier. The method includes transferring the food product to the conveyor 25 at the loading station, and transferring the food product from the conveyor 25 at the unloading station, and changing positions of the food product between the loading and unloading stations, the food product being in one of the first and second positions at the loading station, the food product being in the other of the first and second positions at the unloading station. The method includes changing the position of the food products multiple times between the loading station and the unloading station, e.g. during each traversal around a respective upper and lower loop 128 and 130. In the preferred embodiment, the food product is carried in the first position at the loading station, and is carried in the second position at the unloading station. The method further includes traversing the conveyor 25 around a discharge loop 146 at the unloading station, changing the noted junction from an upwardly facing orientation 122d to a downwardly facing orientation 122e at the unloading station including a change in orientation of the first segment from upwardly angled at 106d to downwardly angled at 106e, and discharging the food product by gravity along the downwardly angled first segment. The method further includes providing the first segment with first and second opposite faces 118 and 120, the first face facing forwardly toward the next food product carrier thereahead, the second face facing aft toward the next food product carrier therebehind. The second face meeting the second segment at the junction 122, and carrying the food product on the second face 120e of the first segment 106e at the unloading station and discharging the food products therealong at the discharge loop.

Present Invention

FIGS. 16-30 use like reference numerals from above where appropriate to facilitate understanding.

FIGS. 16-18 show food processing apparatus including the above noted transport conveyor 56, FIG. 2, carrying food product 24 to loading station 54, FIGS. 1-9, of a food processor such as food processing chamber 22, for loading onto the noted food product cradles 94, FIGS. 2-12. The noted transfer or loader mechanism 66 and transfer bar 58 of FIG. 2 are replaced in FIGS. 16-18 with a loader mechanism 202 including a sweeper 204, FIGS. 17, 18, sweeping food product 24 from transport conveyor 56 to food product cradles 94 of food processor 22. The sweeper is provided by a sweep belt 206 engaging food product 24 in a sweeping motion. Transport conveyor 56 transports food product 24 along a longitudinal direction, as shown at arrow 62, FIGS. 17, 18, at loading station 54. Sweep belt 206 extends longitudinally along such longitudinal direction and is movable laterally as shown at arrow 208 to sweep food product 24 laterally from transport conveyor 56 to food product cradle 94 of food processor 22. In the embodiment of FIGS. 16-18, the food processor is the noted oven having the noted serpentine conveyor 25 having a plurality of flights 124, 126 including a loading flight, e.g. 124 in FIG. 3, having food product carriers 94 moving vertically, as shown at arrow 60, FIGS. 3, 8, past loading station 54. The food product carriers 94 extend horizontally along longitudinal direction 62 and parallel to transport conveyor 56 at loading station 54. Sweep belt 206 extends horizontally along longitudinal direction 62 and parallel to transport conveyor 56 at loading station 54 and on the opposite lateral side thereof from the loading flight of the serpentine conveyor carrying food product cradles 94. Sweep belt 206 moves horizontally laterally, as shown at arrow 208, FIG. 18, to sweep food product 24 from transport conveyor 56 to food product carrier 94 of the noted loading flight.

Sweep belt 206 is taut along the noted longitudinal direction 62.

The sweep belt has a first position, FIG. 17, out of the longitudinal path of movement of food product 24 on transport conveyor 56, and has a second position, FIG. 18, extending into such path. The sweep belt is laterally movable as shown at arrow 208 between the first and second positions, i.e. from the position of FIG. 17 to the position of FIG. 18, to provide the noted sweeping motion. Sweep belt 206 is taut in each of the noted first and second positions of FIGS. 17 and 18, and is parallel to transport conveyor 56 in each of such first and second positions.

Sweeper 204 includes at least a pair of rotary cams 210 and 212, and may include additional cams such as 214, 216, etc. if desired for longer spans. The rotary cams have a first rotated position, FIG. 17, providing a first translational position of sweep belt 206 out of the longitudinal path of movement of food product 24 on transport conveyor 56, and have a second rotated position, FIG. 18, providing a second translational position of sweep belt 206 extending into such path. Rotation of cams 210, 212, 214, 216, about respective rotation axes, 218, 220, 222, 224 from the noted first rotated position of FIG. 17 to the noted second rotated position of FIG. 18 moves sweep belt from the noted first translational position of FIG. 17 to the noted second translational position of FIG. 18, as shown at arrow 208, to provide the noted sweeping motion. Each cam is rotational about its noted respective axis and has at least one and preferably two eccentric lobes extending therefrom, for example as shown at lobes 226 and 228 for cam 210, lobes 230 and 232 for cam 214, lobes 234 and 236 for cam 216, lobes 238 and 240 for cam 212. The lobes are oriented longitudinally in the noted first rotated position, e.g. lobes 226 and 228 of cam 210 are oriented left-right in FIG. 17. The lobes are oriented laterally in the noted second rotated position, e.g. lobes 226 and 228 are oriented up-down in FIG. 18.

Sweep belt 206 is trained around the cams 210, 212, 214, 216 and has first and second segments 242 and 244 extending longitudinally therebetween. First segment 242 is laterally between second segment 244 and food product 24 on transport conveyor 56. First and second segments 242 and 244 are laterally spaced by a first lateral gap 246, FIG. 17, therebetween in the noted first translational position of sweep belt 206. First and second segments 242 and 244 are laterally spaced by a second lateral gap 248, FIG. 18, therebetween in the noted second translational position of sweep belt 206. The second lateral gap 248 is greater than the first lateral gap 246. Cams 210, 212, 214, 216 may be driven in any suitable manner, for example by one or more servo motors such as 250 and drive belts such as 252 therebetween, and may be actuated as above in coordinated timed relation to the arrival of food product at the loading station. Multiple loader mechanisms with sweepers may be provided at the loading station, for example in vertically stacked parallel relation to deliver food product onto loading flight 124 in parallel relation from multiple vertically stacked transport conveyors 56.

FIGS. 19-22 show food processing apparatus including conveyor 56 for carrying food product 24 traversing around a turn 260 on its way to the above noted loading station 54 of a food processor or oven 22. FIG. 19 shows plural turn mechanisms 262, 264, etc. stacked vertically in parallel for traversing respective conveyors 56, 56a, etc. around turn 260. Food product 24 on transport conveyor 56 traverses around turn 260 from an upstream side 270 of the turn to a downstream side 272 of the turn. Turn mechanism 262 includes a moving fence 274 at turn 260 preventing food product 24 from falling off conveyor 56. The remaining turn mechanisms are comparable.

Conveyor 56 has an upper surface 276, FIGS. 21, 22 supporting food product 24 thereon. Moving fence 274 includes at least a position 275, FIG. 22, horizontally aligned with and adjacent food product 24 and above conveyor 56. Turn 260 has an inside 278, FIG. 21, defining an included angle 280, and has an outside 282. Moving fence 274 moves along the outside 282 of turn 260.

Moving fence 274 is provided by a second conveyor in the form of a belt 284, FIGS. 21, 22, trained around a first outer sprocket 286, FIG. 21, on the outside 282 of turn 260 at upstream side 270 of the turn, and trained around a second outer sprocket 288 at the outside of the turn at the downstream side 272 of the turn, and trained around a third outer sprocket 290 on the outside of the turn. A first inner sprocket 292 is provided on the inside 278 of the turn and around which conveyor 56 is trained. A second inner sprocket 294, which may be part of or separate from sprocket 292, is provided on the inside of the turn and around which conveyor 284 is trained. Conveyor 284 has first and second oppositely facing faces 296 and 298. First face 296 faces food product 24 at turn 260 and is preferably cogged and engages inner-turn sprocket 294 in cogged relation. Second face 298 is preferably cogged and engages first, second and third outer-turn sprockets 286, 288, and 290 in cogged relation.

First inner-turn sprocket 292, FIG. 21, rotates about a rotation axis 296 and extends radially outwardly therefrom to an engagement circumference 298 engaging conveyor 56. Second inner-turn sprocket 294 rotates about a rotation axis, preferably the same rotation axis 296 of sprocket 292, and extends radially outwardly therefrom to an engagement circumference 300 engaging conveyor 284. Second inner-turn sprocket 294 is above first inner-turn sprocket 292, FIG. 22. Second engagement circumference 300 extends radially beyond first engagement circumference 298 at turn 260. Second inner-turn sprocket 294 at outer circumference 300 is above food product 24 at turn 260. In preferred form, sprockets 292 and 294 rotate on a common shaft 302 and coincident rotation axes 296.

As noted above and shown in FIGS. 19, 22, a plurality of sets of first and second conveyors may be vertically stacked at turn 260 to carry a respective plurality of food product lines in parallel around the turn, for example as shown at first conveyors 56, 56a, etc., and second conveyors 284, 284a, etc. Each set includes a first conveyor such as 56 trained around a first inner sprocket such as 292, and a respective second conveyor such as 284 trained around a respective second inner sprocket such as 294 and respective first, second and third outer sprockets such as 286, 288, 290. The first inner sprockets such as 292 of the noted vertically stacked sets are vertically aligned. The second inner sprockets such as 294 of the sets are vertically aligned. All of the first and second inner sprockets such as 292 and 294 of the sets rotate on a first common shaft such as 302. All of the first outer sprockets such as 286 of the sets are vertically aligned and rotate on a second common shaft such as 304. All of the second outer sprockets such as 288 of the sets are vertically aligned and rotate on a third common shaft 306. All of the third outer sprockets such as 290 of the sets are vertically aligned and rotate on a fourth common shaft 308. One of the outer sprockets, preferably third outer sprocket 290, is motor driven to drive moving fence 274 at the same speed as conveyor 56 and food product 24 traversing around turn 260.

As noted above, food product 24 may be a tubular member, such as a hot dog, elongated in a longitudinal direction along the direction of movement of conveyor 56. Conveyor 56 traverses in such longitudinal direction and around bend 260 and carries a plurality of food products 24 in serial end to end relation. In the embodiment of FIG. 21, angle 280 is 90°, though other angles may also be used. Moving fence 274 provided by second conveyor 284 traverses around turn 260 and defines in combination with conveyor 56 a guide channel 310, FIG. 22, for food product 24 around turn 260. First and second inner sprockets 292 and 294 are preferably a singular integral member having a first outer circumference at 298 and a second larger outer circumference at 300 thereabove.

FIGS. 23 and 24 show another embodiment providing a guide channel 310a for food product 24 around turn 260. Moving fence 312 at turn 260 prevents food product 24 from falling off conveyor 56. The moving fence is provided by a chain conveyor 314 traversing around turn 260 and defining in combination with conveyor 56 the noted guide channel 310a for food product 24 around turn 260. The moving fence further includes a plurality of suspended fingers 316 depending downwardly from chain conveyor 312 and traversing with food product 24 around turn 260. Conveyor 56 has the noted upper surface 276 supporting food product 24 thereon. Suspended fingers 316 of moving fence 312 include at least portions 316a thereof horizontally aligned with and adjacent food product 24 and above conveyor 56 and below conveyor 314. The suspended fingers 316 of moving fence 312 move along the noted outside 282 of turn 260. Conveyor 314 is trained around a first outer sprocket 318 on the outside 282 of turn 260 at upstream side 270 of the turn, and is trained around a second outer sprocket 320 on the outside 282 of turn 260 at the downstream side 272 of the turn, and is trained around a third outer sprocket 322 on the outside 282 of turn 260, with the latter sprocket preferably being the motor driven sprocket. A first inner sprocket 324 is provided on the inside 278 of turn 260 and around which conveyor 56 is trained. A second inner sprocket 326 is provided on the inside 278 of turn 260 and around which conveyor 314 is trained. Conveyor 314 carries the noted suspended fingers 316 depending downwardly therefrom. Conveyor 314 has first and second oppositely facing faces 328 and 330. First face 328 faces food product 24 at turn 260 and engages second inner sprocket 326 in toothed relation. Second face 330 engages first, second and outer sprockets 318, 320 and 322 in toothed relation.

FIGS. 25-30 show a food processing apparatus including a conveyor to conveyor transfer mechanism upstream of turn 260, which turn is upstream of loading station 54. As above noted, food product 24 is delivered from a food making system, such as a sausage making machine sold by Townsend Engineering Co. under their trademark KONTURA, for example as schematically shown 340, FIG. 25. A first conveyor 342 traverses between upstream and downstream ends 344 and 346, i.e. leftwardly in FIG. 25, downwardly in FIG. 26 as shown at arrow 348, and then returns as shown at arrow 350. Conveyor 342 has a reception section 352 for receiving food product 24 from sausage making machine 340, and has a discharge section 354 for discharging food product 24 to conveyor 56 therebelow during traverse of conveyor 342. Food product 24 is discharged from conveyor 342 to conveyor 56 therebelow prior to reaching downstream end 346.

Conveyor 342 is provided by a pair of belts 356 and 358, FIGS. 26-29, coursing respective first and second paths between the noted upstream and downstream ends. Such first and second paths have varying spatial relation relative to each other during such traverse, FIGS. 27-29. The paths have an initial segment 360 at section line 27-27, FIGS. 25-27, at reception section 352 jointly receiving food product 24. The paths have an intermediate segment 362 at section line 28-28, maintaining food product 24 thereat but beginning to allow food product 24 to slip downwardly as shown at arrow 364, FIG. 28. The paths have a discharge segment 366 at section line 29-29, at discharge section 354, laterally spaced from each other by a gap 368, FIG. 29, greater than the width of food product 24, whereby to discharge food product 24 through gap 368 to conveyor 56 therebelow.

Each of belts 356 and 358 has a food surface 370 and 372, respectively, FIG. 27, for contacting food product 24. The noted varying spatial relation of the paths of belts 356 and 358 varies at least one of: a) the lateral spacing of belt food surfaces 370 and 372, i.e. the left-right spacing in FIGS. 26-29; and b) the angular orientation of at least one of belt food surfaces 370 and 372 relative to vertical. Belt food surfaces 370 and 372 have an inclination angle relative to vertical at reception section 352, FIGS. 26, 27, jointly forming a V-shape, preferably a frusto V-shape, having a lower included apex 374, which may be a pointed apex or a frusto apex, receiving food product 24. In one embodiment, belts 356 and 358 move laterally away from each other as they move from upstream to downstream, to separate belt food surfaces 370 and 372 and provide a widening gap therebetween at lower apex 374 through which food product 24 falls to conveyor 56 therebelow as shown at widened gap 368 in FIG. 29. In another embodiment, the angular orientation of at least one of the belt food surfaces 370 and 372 varies from upstream to downstream to a lesser angle relative to vertical to provide a widening gap between the belt food surfaces 370 and 372 at lower apex 374 through which food product 24 falls to conveyor 56 therebelow. In another embodiment, both of the noted orientation variances are employed to widen the gap between the belt food surfaces for the noted food product transference. In the disclosed embodiment, food product 24 is a tubular member, e.g. a hot dog elongated in the noted longitudinal direction, and each of conveyors 342 and 56 traverses along such longitudinal direction and carries a plurality of food products 24 in serial end to end relation, and the gap between belt food surfaces 370 and 372 at lower apex 374 widens along the noted lateral direction transverse to the noted longitudinal direction and transverse to vertical during the noted traverse from upstream to downstream, FIG. 25.

FIG. 30 shows a pair of conveyors 342 and 342a in parallel for transferring food product 24 to respective conveyors 56 and 56a therebelow in parallel. One or more sausage making machines would be located as shown at 340 in FIG. 30, for discharging food product 24 to a respective conveyor 342, 342a at reception section 352 at upstream end 344. Lower apex 374 of the V-shaped belts 356 and 358 widens to gap 368 to discharge food product to the respective conveyor 56, 56a therebelow. An initial upstream guide form 380 guides and channels the belts into their initial V-shape for receiving food product 24 from the sausage making machine at 340. A downstream guide form 382 guides and channels the belts to laterally separate same and/or change the angular orientation of at least one of the belts, to provide the noted widening gap to enable discharge at gap 368 to the lower conveyor 56, 56a.

The system provides food processing apparatus having a first conveyor 342 traversing between upstream and downstream ends, the first conveyor having a reception section 352 for receiving a food product 24, and having a discharge section 354 for discharging the food product to a second conveyor 56 below the first conveyor during traverse of the first conveyor, the second conveyor 56 carrying food product 24 and traversing around a turn 260 from an upstream side 270 of the turn to a downstream side 272 of the turn, a moving fence 274, 312 at the turn preventing food product 24 from falling off conveyor 56, the conveyor 56 carrying food product 24 from the turn 260 to a loading station 54 of a food processor such as an oven or the like 22, a loader mechanism 202 at loading station 54 for transferring food product 24 from the noted second conveyor 56 to food product cradles 94 of food processor 22, the loader mechanism including a sweeper 204 sweeping food product 24 from conveyor 56 to food product cradles 94 of food processor 22, the sweeper being provided by a belt 206 engaging food product 24 in a sweeping motion. The food product is discharged from conveyor 342 to conveyor 56 therebelow prior to reaching the downstream end 346 of conveyor 342, the second conveyor 56 having an upper surface 276 supporting food product 24 thereon, the moving fence 274, 312, including at least a portion 274a, 316a horizontally aligned with and adjacent food product 24 and above conveyor 56, the conveyor 56 transporting food product 24 along the noted longitudinal direction at loading station 54, the noted sweep belt 206 extending longitudinally along the noted longitudinal direction and being movable laterally to sweep food product 24 laterally from conveyor 56 to food product cradles 94 of food processor 22.

The present system provides a food processing method including traversing a first conveyor 342 between upstream and downstream ends, providing the first conveyor with a reception 352 for receiving a food product 24, providing the first conveyor with a discharge section 354 for discharging the food product to a second conveyor 56 below the first conveyor during the traverse of the first conveyor, traversing the second conveyor 56 around a turn 260 for carrying food product 24 around the turn, providing a moving fence 274, 312 at the turn preventing food product 24 from falling off the second conveyor 56 traversing the second conveyor 56 to a loading station 54 of a food processor 22 for carrying food product 24 thereto, providing a loader mechanism 202 at the loading station for transferring food product 24 from the second conveyor 56 to food product cradles 94 of the food processor, providing the loader mechanism with a sweeper 204 and sweeping food product 24 from the second conveyor 56 to the food product cradles 94 of the food processor 22, and providing the sweeper with a sweep belt 206 engaging food product 24 in a sweeping motion.

It is recognized that various equivalents, alternatives and modifications are possible within the scope of the appended claims.

What is claimed is:

1. Food processing apparatus comprising a transport conveyor for carrying a food product to a loading station of a food processor, a loader mechanism at said loading station for transferring said food product from said transport conveyor to said food processor, said loader mechanism comprising a sweeper sweeping said food product from said transport conveyor to said food processor, said sweeper comprising a sweep belt engaging said food product in a sweeping motion, wherein said transport conveyor transports said food product along a longitudinal direction at said loading station, said sweep belt extends longitudinally along said longitudinal direction and is moveable laterally to sweep said food product laterally from said transport conveyor to said food processor, wherein said sweep belt is taut along said longitudinal direction, and has a first position out of the longitudinal path of movement of said food product on said transport conveyor, and a second position extending into said path, said sweep belt being laterally moveable between said first and second positions to provide said sweeping motion.

2. The food processing apparatus according to claim 1 wherein said sweep belt is taut in each of said first and second positions.

3. The food processing apparatus according to claim 2 wherein said sweep belt is parallel to said transport conveyor in each of said first and second positions.

4. Food processing apparatus comprising a transport conveyor for carrying a food product to a loading station of a food processor, a loader mechanism at said loading station for transferring said food product from said transport conveyor to said food processor, said loader mechanism comprising a sweeper sweeping said food product from said transport conveyor to said food processor, said sweeper comprising a sweep belt engaging said food product in a sweeping motion, wherein said transport conveyor transports said food product along a longitudinal direction at said loading station, said sweep belt extends longitudinally along said longitudinal direction and is moveable laterally to sweep said food product laterally from said transport conveyor to said food processor, wherein said sweeper comprises a pair of rotary cams having a first rotated position providing a first translational position of said sweep belt out of the longitudinal path of movement of said food product on said transport conveyor, and having a second rotated position providing a second translational position of said sweep belt extending into said path, wherein rotation of said cams from said first rotated position to said second rotated position moves said sweep belt from said first translational position to said second translational position to provide said sweeping motion.

5. The food processing apparatus according to claim 4 wherein each said cam is rotational about a respective axis and has at least one eccentric lobe extending therefrom, said lobes being oriented longitudinally in said first rotated position, said lobes being oriented laterally in said second rotated position.

6. The food processing apparatus according to claim 4 wherein said sweep belt is trained around said cams and has first and second segments extending longitudinally therebetween, said first segment being laterally between said second segment and said food product on said transport conveyor, said first and second segments being laterally spaced by a first lateral gap therebetween in said first translational position of said sweep belt, said first and second segments being laterally spaced by a second lateral gap therebetween in said second translational position of said sweep belt, said second lateral gap being greater than said first lateral gap.

7. Food processing apparatus comprising a conveyor for carrying a food product traversing around a turn from an upstream side of said turn to a downstream side of said turn, and a moving fence at said turn preventing said food product from falling off said conveyor, wherein said conveyor has an upper surface supporting said food product thereon, and said moving fence includes at least a portion horizontally aligned with and adjacent said food product and above said conveyor, wherein said turn has an inside defining an included angle, and has an outside, and wherein said moving fence moves along said outside of said turn, wherein said moving fence comprises a second conveyor trained around a first outer sprocket on said outside of said turn at said upstream side of said turn, and trained around a second outer sprocket at said outside of said turn at said downstream side of said turn, and trained around a third outer sprocket on said outside of said turn, and comprising a first inner sprocket on said inside of said turn and around which said first mentioned conveyor is trained, and a second inner sprocket on said inside of said turn and around which said second conveyor is trained, said second conveyor having first and second oppositely facing faces, said first face facing said food product at said turn and engaging said second inner sprocket, said second face engaging said first, second and third outer sprockets.

8. The food processing apparatus according to claim 7 wherein said first inner sprocket rotates about a rotation axis and extends radially outwardly therefrom to an engagement circumference engaging said first conveyor, said second inner sprocket rotates about a rotation axis and extends radially outwardly therefrom to an engagement circumference engaging said second conveyor.

9. The food processing apparatus according to claim 8 wherein said second inner sprocket is above said first inner sprocket, said second engagement circumference extends radially beyond said first engagement circumference at said turn, and said second inner sprocket at said second engagement circumference is above said food product at said turn.

10. The food processing apparatus according to claim 9 wherein said first and second inner sprockets rotate on a common shaft and coincident said rotation axes.

11. The food processing apparatus according to claim 9 comprising a plurality of sets of said first and second conveyors vertically stacked at said turn to carry a respective plurality of food product lines in parallel around said turn.

12. The food processing apparatus according to claim 11 wherein each said set comprises a respective said first conveyor trained around a respective said first inner sprocket, and a respective said second conveyor trained around a respective said second inner sprocket and respective said first, second and third outer sprockets, said first inner sprockets of said sets being vertically aligned, said second inner sprockets of said sets being vertically aligned, all of said first and second inner sprockets of said sets rotating on a first common shaft, all of said first outer sprockets of said sets being vertically aligned and rotating on a second common shaft, all of said second outer sprockets of said sets being vertically aligned and rotating on a third common shaft, all of said third outer sprockets of said sets being vertically aligned and rotating on a fourth common shaft.

13. The food processing apparatus according to claim 9 wherein said food product is a tubular member elongated in a longitudinal direction, said first conveyor traverses in said longitudinal direction and around said bend and carries a plurality of said food products in serial end to end relation.

14. Food processing apparatus comprising a conveyor for carrying a food product traversing around a turn from an upstream side of said turn to a downstream side of said turn, and a moving fence at said turn preventing said food product from falling off said conveyor, wherein said moving fence comprises a second conveyor traversing around said turn and defining in combination with said first mentioned conveyor a guide channel for said food product around said turn.

15. The food processing apparatus according to claim 14 wherein said moving fence further comprises a plurality of suspended fingers depending downwardly from said second conveyor and traversing with said food product around said turn.

16. The food processing apparatus according to claim 15 wherein said first conveyor has an upper surface supporting said food product thereon, said suspended fingers of said moving fence include at least portions thereof horizontally aligned with and adjacent said food product and above said first conveyor and below said second conveyor.

17. The food processing apparatus according to claim 16 wherein said turn has an inside defining an included angle, and has an outside, and wherein said suspended fingers of said moving fence move along said outside of said turn, said second conveyor is trained around a first outer sprocket on said outside of said turn at said upstream side of said turn, and trained around a second outer sprocket on said outside of said turn at said downstream side of said turn, and trained around a third outer sprocket on said outside of said turn, and comprising a first inner sprocket on said inside of said turn and around which said first conveyor is trained, and a second inner sprocket on said inside of said turn and around which said second conveyor is trained, said second conveyor carrying said suspended fingers depending downwardly therefrom, said second conveyor having first and second oppositely facing faces, said first face facing said food product at said turn and engaging said second inner sprocket, said second face engaging said first, second and third outer sprockets.

18. Food processing apparatus comprising a transport conveyor for carrying a food product to a loading station of a food processor along an axial direction, a loader mechanism at said loading station for laterally transferring said food product from said transport conveyor to said food processor along a lateral direction, said loader mechanism comprising a sweeper sweeping said food product from said transport conveyor to said food processor, said sweeper comprising a sweep belt engaging said food product in a sweeping motion, wherein said sweep belt is laterally spaced from said food product by a lateral gap prior to arrival of said food product at said loading station, and wherein said sweep belt laterally closes said gap and engages said food product at said loading station in a lateral sweeping motion to laterally transfer said food product from said transport conveyor to said food processor along said lateral direction.

19. The food processing apparatus according to claim 18 wherein said sweep belt comprises a longitudinally extending segment, said longitudinally extending segment having first and second laterally translated positions, said longitudinally extending segment in said first laterally translated position being out of the longitudinal path of movement of said food product on said transport conveyor, said longitudinally extending segment in said second laterally translated position traversing laterally across said path of movement of said food product on said transport conveyor.

20. The food processing apparatus according to claim 18 wherein said sweep belt comprises longitudinally extending first and second segments, said longitudinally extending first segment being laterally between said longitudinally extending second segment and said food product on said transport conveyor, said longitudinally extending first and second segments having first and second laterally translated positions, said longitudinally extending first and second segments being laterally spaced by a first lateral gap therebetween in said first laterally translated position, said longitudinally extending first and second segments being laterally spaced by a second lateral gap therebetween in said second laterally translated position, said second lateral gap being greater than said first lateral gap, wherein lateral separation of said longitudinally extending first and second segments to said second gap provides said lateral sweeping motion.

21. Food processing apparatus comprising a transport conveyor for carrying a food product to a loading station of a food processor, a loader mechanism at said loading station for transferring said food product from said transport conveyor to said food processor, said loader mechanism comprising a sweeper sweeping said food product from said transport conveyor to said food processor, said sweeper comprising a sweep belt engaging said food product in a sweeping motion, wherein said transport conveyor transports said food product along a longitudinal direction at said loading station, said sweep belt extends longitudinally along said longitudinal direction and is moveable laterally to sweep said food product laterally from said transport conveyor to said food processor, wherein said sweep belt comprises a longitudinally extending segment, said longitudinally extending segment having first and second laterally translated positions, said longitudinally extending segment in said first laterally translated position being out of the longitudinal path of movement of said food product on said transport conveyor, said longitudinally extending segment in said second laterally translated position traversing laterally across said path of movement of said food product on said transport conveyor.

22. Food processing apparatus comprising a transport conveyor for carrying a food product to a loading station of a food processor, a loader mechanism at said loading station for transferring said food product from said transport conveyor to said food processor, said loader mechanism comprising a sweeper sweeping said food product from said transport conveyor to said food processor, said sweeper comprising a sweep belt engaging said food product in a sweeping motion, wherein said transport conveyor transports said food product along a longitudinal direction at said loading station, said sweep belt extends longitudinally along said longitudinal direction and is moveable laterally to sweep said food product laterally from said transport conveyor to said food processor, wherein said sweep belt comprises longitudinally extending first and second segments, said longitudinally extending first segment being laterally between said longitudinally extending second segment and said food product on said transport conveyor, said longitudinally extending first and second segments having first and second laterally translated positions, said longitudinally extending first and second segments being laterally spaced by a first lateral gap therebetween in said first laterally translated position, said longitudinally extending first and second segments being laterally spaced by a second lateral gap therebetween in said second laterally translated position, said second lateral gap being greater than said first lateral gap, wherein lateral separation of said longitudinally extending first and second segments to said second gap provides said lateral sweeping motion.

\* \* \* \* \*